United States Patent
Tsuruoka

(10) Patent No.: US 7,916,187 B2
(45) Date of Patent: Mar. 29, 2011

(54) IMAGE PROCESSING APPARATUS, IMAGE PROCESSING METHOD, AND PROGRAM

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 1190 days.

(21) Appl. No.: 11/586,048

(22) Filed: Oct. 25, 2006

(65) Prior Publication Data

US 2007/0040919 A1 Feb. 22, 2007

Related U.S. Application Data

(63) Continuation of application No. PCT/JP2005/007922, filed on Apr. 26, 2005.

(30) Foreign Application Priority Data

Apr. 27, 2004 (JP) .................. 2004-132075

(51) Int. Cl.
- H04N 5/217 (2006.01)
- H04N 9/64 (2006.01)
- H04N 5/20 (2006.01)
- G06K 9/38 (2006.01)
- G06K 9/40 (2006.01)

(52) U.S. Cl. ........ 348/241; 348/243; 348/246; 348/248; 348/255; 382/270; 382/260; 382/274

(58) Field of Classification Search .......... 348/241–253, 348/255; 382/260, 254, 270, 273, 274, 275, 382/162

See application file for complete search history.

(56) References Cited

U.S. PATENT DOCUMENTS

| | | | | |
|---|---|---|---|---|
| 5,987,185 | A | 11/1999 | Suzuki | |
| 7,031,548 | B2 * | 4/2006 | Baggs | 382/261 |
| 7,570,287 | B2 * | 8/2009 | Tsuruoka | 348/241 |
| 7,656,442 | B2 * | 2/2010 | Tsuruoka | 348/241 |
| 7,812,865 | B2 * | 10/2010 | Tsuruoka | 348/241 |
| 2004/0001621 | A1 * | 1/2004 | Kusakabe et al. | 382/164 |
| 2004/0027469 | A1 | 2/2004 | Tsuruoka | |
| 2010/0195926 | A1 * | 8/2010 | Sasaki | 382/260 |

FOREIGN PATENT DOCUMENTS

| | | |
|---|---|---|
| JP | 03-185574 A | 8/1991 |
| JP | 05-041867 A | 2/1993 |
| JP | 10-341375 A | 12/1998 |
| JP | 11-220660 A | 8/1999 |
| JP | 2001-157057 A | 6/2001 |
| JP | 2002-247412 A | 8/2002 |
| JP | 2002-323567 A | 11/2002 |
| JP | 2004-040235 A | 2/2004 |
| JP | 2004-072422 A | 3/2004 |
| JP | 2004-088149 A | 3/2004 |
| JP | 2004-128985 A | 4/2004 |
| WO | WO 2004/019608 A1 | 3/2004 |
| WO | WO 2004/032486 A1 | 4/2004 |

* cited by examiner

Primary Examiner — Lin Ye
Assistant Examiner — Marly Camargo
(74) Attorney, Agent, or Firm — Holtz, Holtz, Goodman & Chick, PC

(57) ABSTRACT

An object of the present invention is to provide an image processing apparatus that obtains a high-quality image signal by determining an amount of noise in an optimum fashion and reducing the amount of noise. The image processing apparatus reduces a noise component contained in the image signal picked up by an image pickup element and digitized. The image processing apparatus includes a determining unit which determines whether or not a target pixel in the image signal is within a predetermined noise range for each pixel, and a noise reducing unit which reduces the noise of the target pixel based on the determination result.

42 Claims, 16 Drawing Sheets

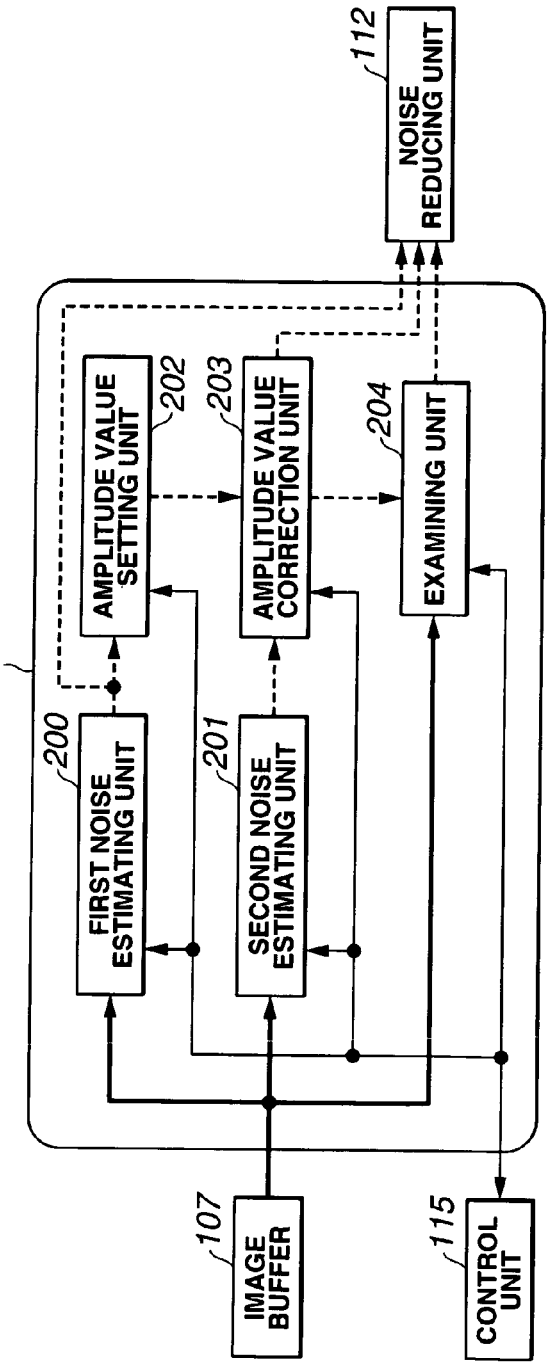
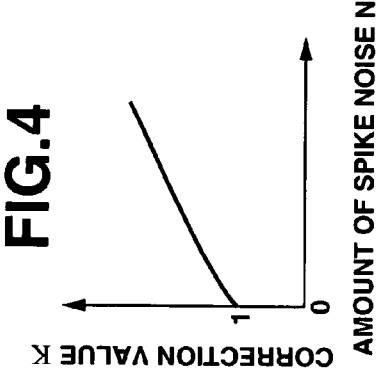

FIG.3

| $P_{00}$ | $P_{10}$ | $P_{20}$ |
|---|---|---|
| $P_{01}$ | $P_{11}$ | $P_{21}$ |
| $P_{02}$ | $P_{12}$ | $P_{22}$ |

AMOUNT OF RANDOM NOISE $N_R$

AMOUNT OF SPIKE NOISE $N_S$

IMAGE PROCESSING APPARATUS, IMAGE PROCESSING METHOD, AND PROGRAM

CROSS REFERENCE TO RELATED APPLICATION

This application is a continuation application of PCT/JP2005/007922 filed on Apr. 26, 2005 and claims benefit of Japanese Application No. 2004-132075 filed in Japan on Apr. 27, 2004, the entire contents of which are incorporated herein by this reference.

BACKGROUND OF THE INVENTION

1. Field of the Invention

The present invention relates to an image processing apparatus, an image processing method, and a program and, in particular, to an image processing apparatus, an image processing method, and program which reduce noise components with high precision, by a determination processing whether or not noise exists and a noise reduction processing for each pixel.

2. Description of the Related Art

Noise components contained in a digital signal that is obtained from an image pickup element, an analog circuit in association with the image pickup element and an analog-to-digital (hereinafter referred to as A/D) converter are roughly categorized into random noise and spike noise. The random noise is generated in the image pickup element and the analog circuit, and has characteristics similar to those of white nose. The spike noise is mainly caused by an image pickup element such as a defective pixel therewithin.

Japanese Unexamined Patent Application Publication No. 2001-157057 discloses a random noise treating technique in which an amount of luminance noise is expressed in function relating to a signal level, the amount of luminance noise relating to the signal level is then estimated from the function, and frequency characteristics of filtering are then controlled based on the amount of luminance noise. In this way, a noise reduction process of random noise is performed with respect to the signal level.

As disclosed in Japanese Unexamined Patent Application Publication No. 2001-157057, the amount of random noise is represented by function $N=ab^{cD}$ where N represents an amount of random noise and D represents a density value converted signal level. Here, a, b, and c represent constants, respectively, and are static values.

Japanese Unexamined Patent Application Publication No. 5-41867 discloses a spike noise treating technique in which the spike noise is detected by comparing each pixel with a maximum value or minimum value of each of surrounding pixels, and the pixel is replaced with the maximum value or the minimum value if determined as being spike noise. In this way, the noise reduction process is performed on the spike noise.

SUMMARY OF THE INVENTION

An image processing apparatus of the present invention reduces a noise component contained in an image signal that has been picked up by an image pickup element and digitized, the image processing apparatus including a determining unit which determines whether or not a target pixel in the image signal is within a predetermined noise range for each pixel, and a noise reducing unit for reducing the noise of the target pixel based on the determination result.

BRIEF DESCRIPTION OF THE DRAWINGS

FIG. 2 is a block diagram of a noise determining unit in accordance with the first embodiment of the present invention.

Figure 3:
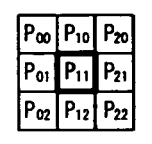

FIG. 3 is an explanatory diagram on a local region used by the noise determining unit in accordance with a first embodiment of the present invention.

FIG. 4 is an explanatory diagram on a correction function for use in an amplitude value correction unit in accordance with the first embodiment of the present invention.

FIG. 14 is an explanatory diagram illustrating separation of a color signal in accordance with the second embodiment of the present invention.

FIG. 15 is an explanatory diagram illustrating separation of image signal on an image buffer according to four types of color filters in accordance with the second embodiment of the present invention.

DETAILED DESCRIPTION OF THE PREFERRED EMBODIMENT(S)

The embodiments of the present invention are described below with reference to the drawings.

First Embodiment

Configuration

Figure 1:
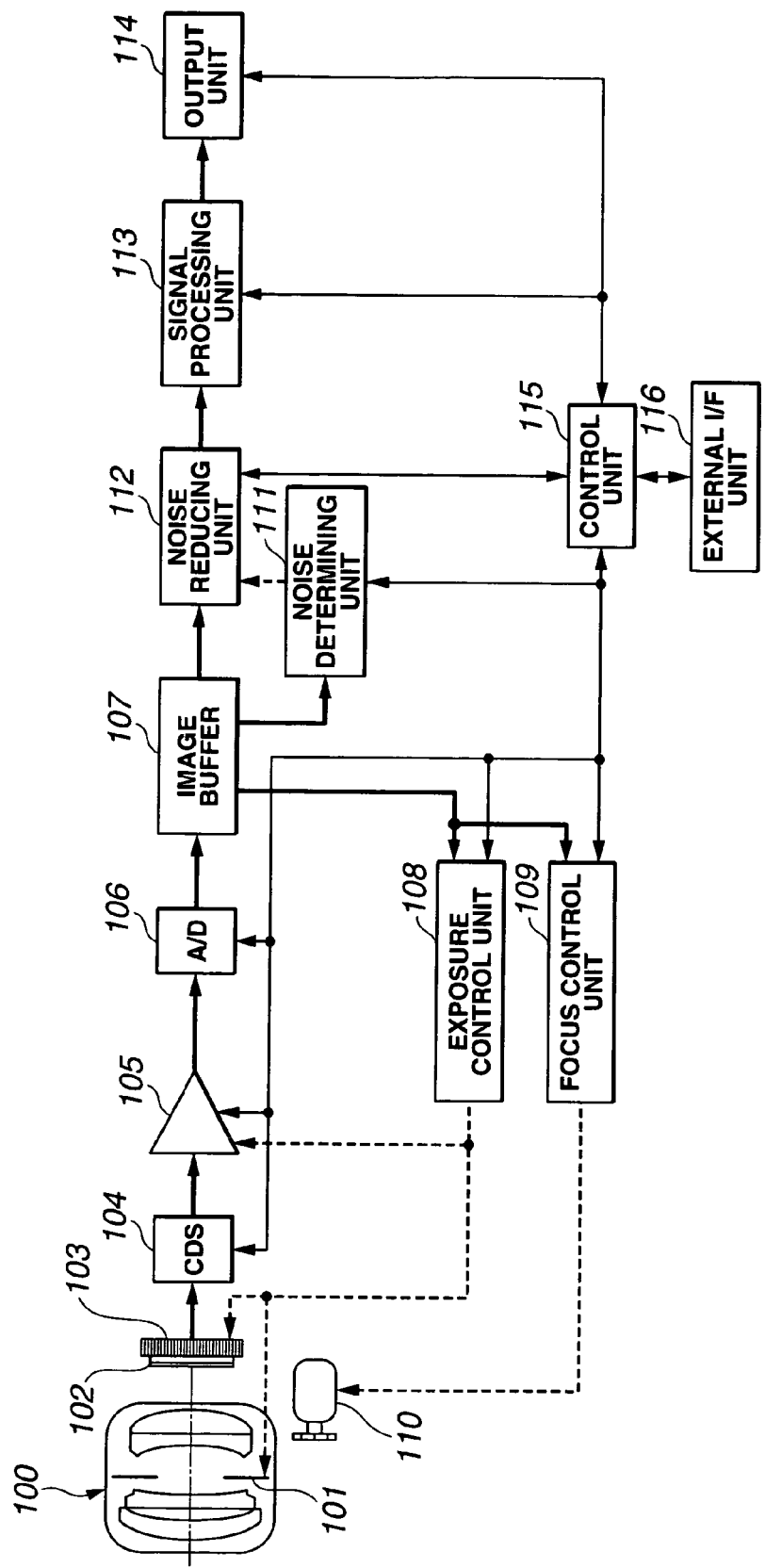
FIG. 1 is a block diagram of an image pickup system in accordance with a first embodiment of the present invention.
Figure 5:
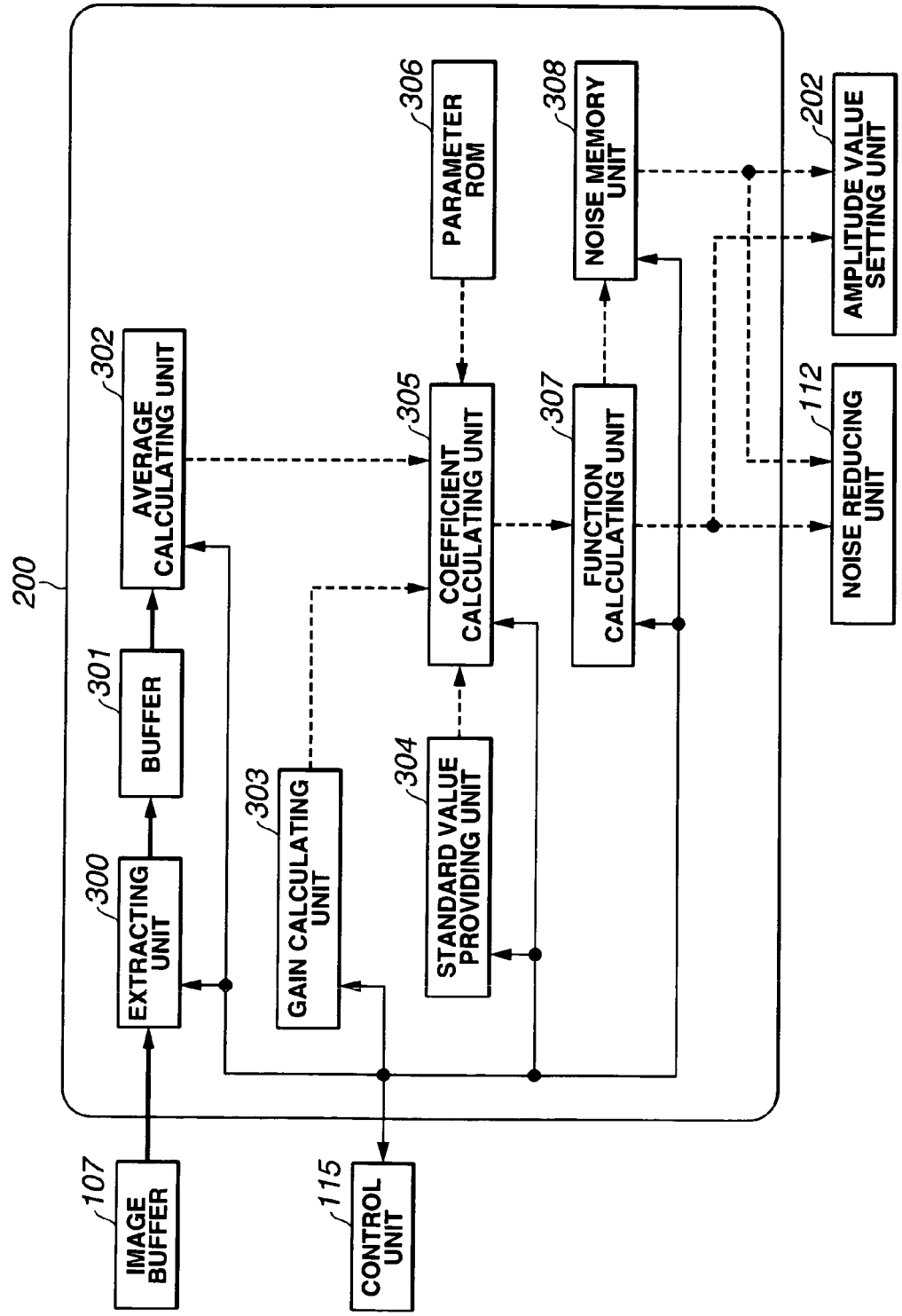
FIG. 5 is a block diagram illustrating a first noise estimating unit in accordance with the first embodiment of the present invention.
Figure 6:
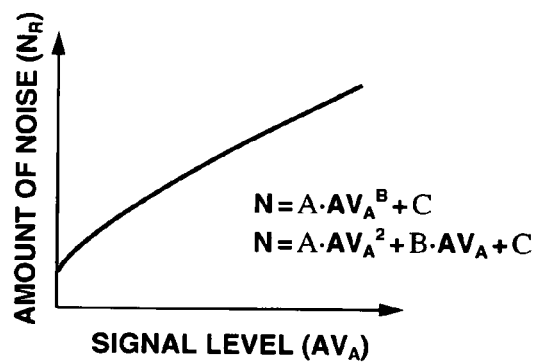
FIG. 6 is a graph showing the relationship between a signal level and an amount of noise, and also an explanatory diagram illustrating a formulization of the amount of random noise in accordance with the first embodiment of the present invention.
Figure 7:
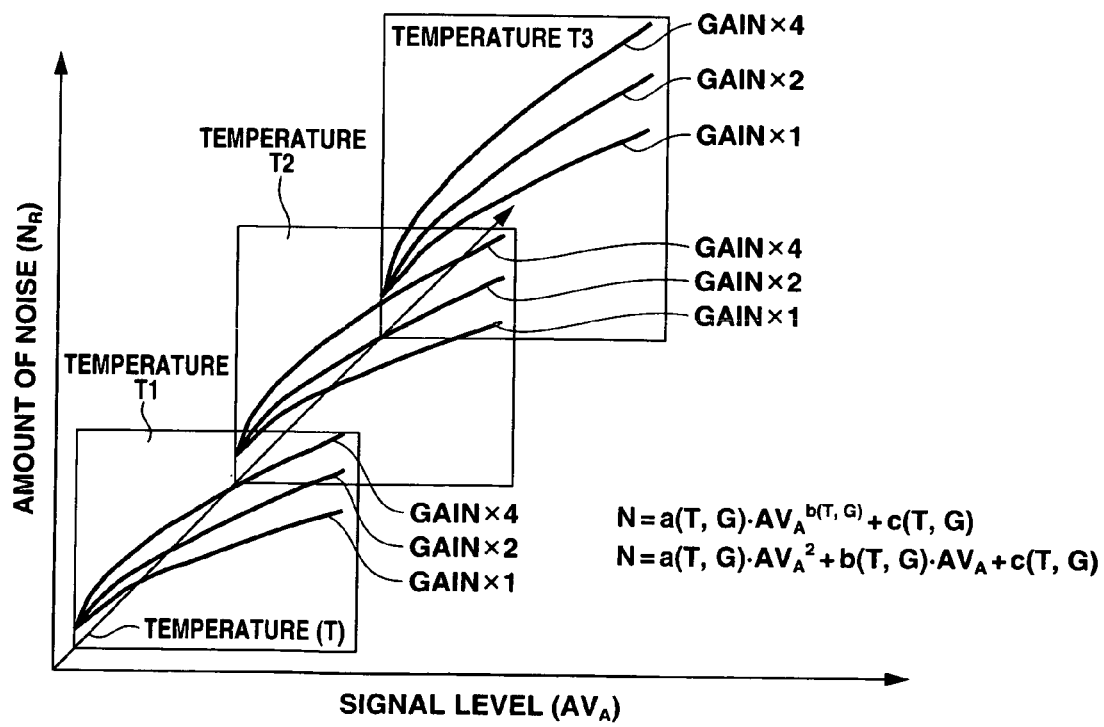
FIG. 7 is a graph showing the relationship of the amount of noise to a signal level, temperature, and gain, and also an explanatory diagram illustrating a formulization of the amount of random noise in accordance with the first embodiment of the present invention.
Figure 8:
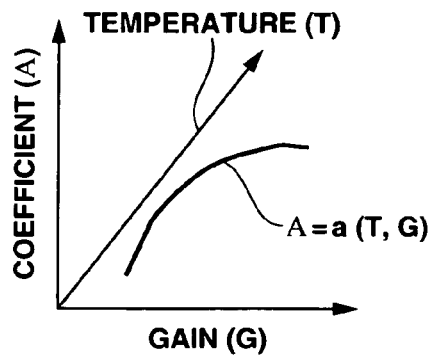
FIG. 8 is a graph showing characteristics of function a( ) in equation (6), and also an explanatory diagram illustrating a parameter for use in calculating the amount of random noise in accordance with the first embodiment of the present invention.
Figure 9:
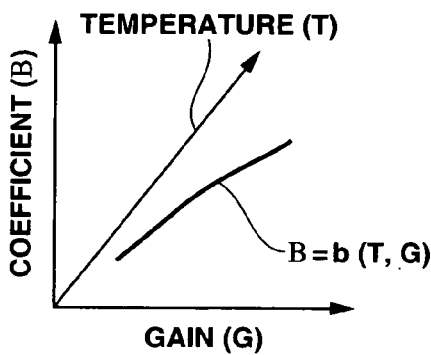
FIG. 9 is a graph showing characteristics of function b( ) in equation (6), and also an explanatory diagram illustrating a parameter for use in calculating the amount of random noise in accordance with the first embodiment of the present invention.
Figure 10:
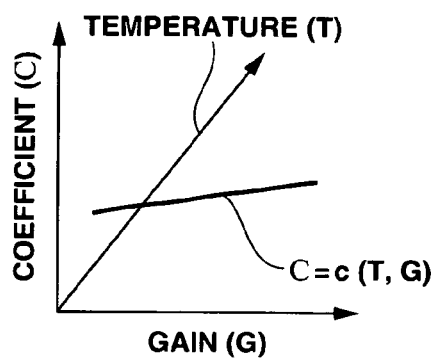
FIG. 10 is a graph showing characteristics of function c( ) in equation (6), and also an explanatory diagram illustrating a parameter for use in calculating the amount of random noise in accordance with the first embodiment of the present invention.
Figure 11:
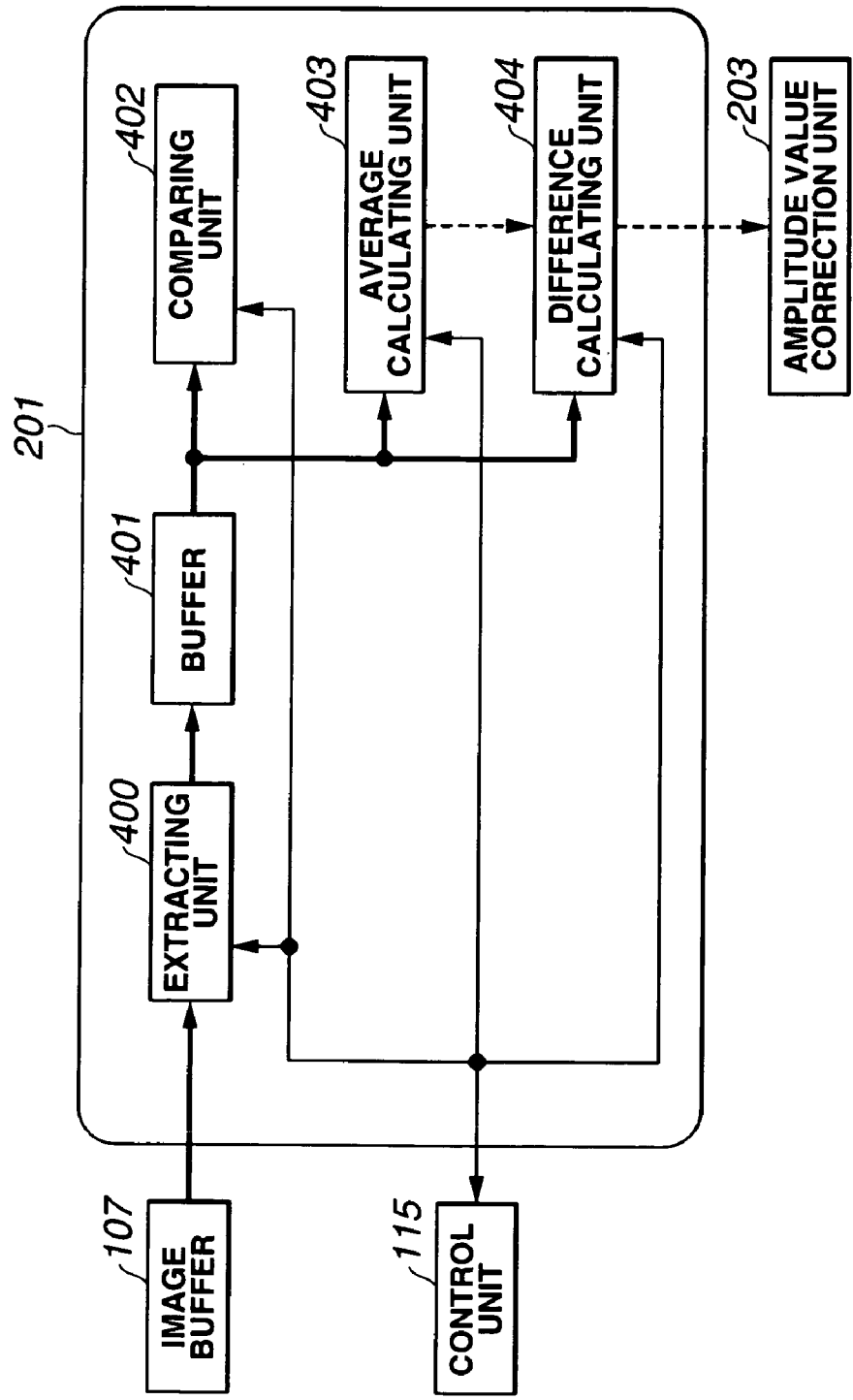
FIG. 11 is a block diagram illustrating a second noise estimating unit in accordance with the first embodiment of the present invention.
Figure 12:
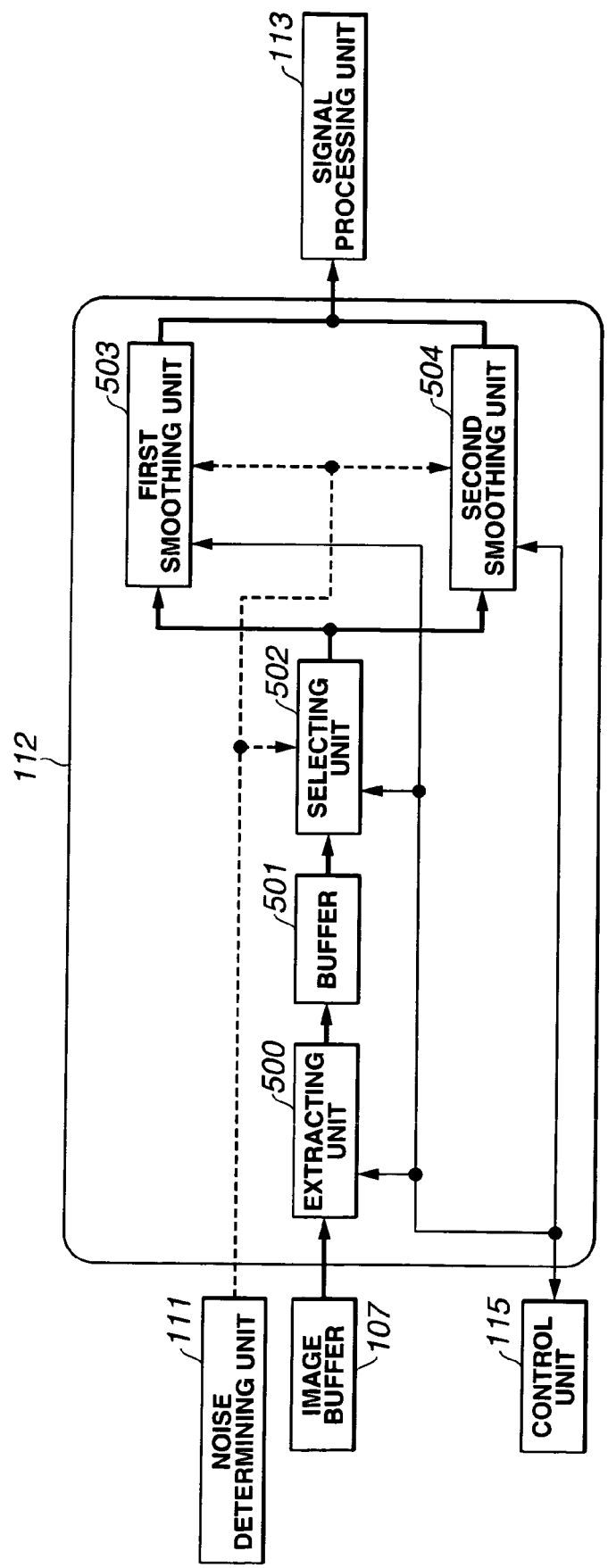
FIG. 12 is a block diagram illustrating a noise reducing unit in accordance with the first embodiment of the present invention.

First, an image pickup system of an embodiment of the present invention is described below. The image pickup system is an image pickup apparatus such a still camera, and includes an image processing apparatus as a standard component or as an add-on component. FIG. 1 is a block diagram of an image pickup system in accordance with the present embodiment. FIG. 2 is a block diagram of a noise determining unit. FIG. 3 shows a local region used by the noise determining unit. FIG. 4 illustrates a correction function for use in an amplitude value correction unit. FIG. 5 is a block diagram illustrating a first noise estimating unit. FIGS. 6 and 7 illustrate a formulization of the amount of random noise. FIG. 6 shows the relationship between a signal level and an amount of noise, and also illustrating a formulization of the amount of random noise. FIG. 7 illustrates the relationship of the amount of noise to a signal level, temperature, and gain. FIGS. 8 through 10 illustrate parameter for use in calculating the amount of random noise. FIG. 11 is a block diagram illustrating a second noise estimating unit. FIG. 12 is a block diagram illustrating a noise reducing unit.

As shown in FIG. 1, an optical system 100 includes a plurality of lenses as objective lenses and an aperture 101. An optical image formed via the optical system 100 passes through a low-pass filter 102 and then is formed an image on an image pickup surface of a charge-coupled device (hereinafter referred to as CCD) 103 serving as a black-and-white solid-state image pickup element. The output signal of the CCD 103 is sampled by a correlated double sampling (hereinafter referred to as CDS) circuit 104, amplified by an amplifier 105, and then converted into a digital signal by an A/D converter 106.

The output signal of the A/D converter 106 is supplied via an image buffer 107 to an exposure control unit 108, a focus control unit 109, a noise determining unit 111, and a noise reducing unit 112. The exposure control unit 108 is connected to each of the aperture 101, the CCD 103, and the amplifier 105. The focus control unit 109 is connected to an AF motor 110 as an auto-focusing (hereinafter referred to as AF) motor.

The noise determining unit 111 as determining means is connected to the noise reducing unit 112. The noise reducing unit 112 is connected via a signal processing unit 113 to an output unit 114 of a memory card or the like. A control unit 115, such as a microcomputer, is connected to each of the CDS circuit 104, the amplifier 105, the A/D converter 106, the exposure control unit 108, the focus control unit 109, the noise determining unit 111, the noise reducing unit 112, the signal processing unit 113, and the output unit 114 so as to bidirectionally transmit and receive signals to and from each of these units. To bidirectionally transmit and receive signals, the control unit 115 is also connected to an external I/F unit 116 that includes a power switch, a shutter button, an interface for switching various types of photographic modes. Shooting condition data such as ISO sensitivity set by a photographer is input from the external I/F unit 116 to the control unit 115.
(Function)

A signal flow in the image pickup system of FIG. 1 is described below. As shown, a bold solid line represents the flow of an image signal, a thin solid line represents the flow of a control signal, and a broken line represents the flow of other signals. After the shooting condition such as ISO sensitivity and the like has been set via the external I/F unit 116, the pre shooting mode is entered by half pressing the shutter button. An image signal, obtained as a result of shooting using the optical system 100, the aperture 101, the low-pass filter 102, and the CCD 103, is read as an analog signal through a known correlated double sampling process of the CDS circuit 104. In the present embodiment, the CCD 103 is a black-and-white CCD. The analog signal is amplified by the amplifier 105 by a predetermined amount, and then converted into a digital signal by the A/D converter 106. The resulting digital signal is transferred to the image buffer 107.

Data of the image signal in the image buffer 107 (also simply referred to as image signal) is transferred to the exposure control unit 108 and the focus control unit 109. The exposure control unit 108 determines the luminance level of the image signal, and controls an aperture value of the aperture 101, an electric shutter speed of the CCD 103, an amplification rate of the amplifier 105 and the like in consideration of the ISO sensitivity and shutter speed of the limit of image stability or the like, so that an appropriate exposure is obtained. Furthermore, the focus control unit 109 detects an edge intensity in the image signal, and controls the AF motor 110 for maximum edge intensity in order to obtain a focused image.

Next, the real shooting operation is performed by detecting via the external I/F unit 116 that the shutter button has been fully pressed. An image signal is transferred to the image buffer 107 in the same way as in the pre shooting mode. The real shooting operation is performed based on the exposure condition determined by the exposure control unit 108 and the focus condition determined by the focus control unit 109. The shooting conditions are then transferred to the control unit 115. The image signal in the image buffer 107 is transferred to the noise determining unit 111.

Under the control of the control unit 115, the exposure condition determined by the exposure control unit 108 and the shooting condition such as the ISO sensitivity set by the external I/F unit 116 are also transferred to the noise determining unit 111. Based on these conditions and the image signal, the noise determining unit 111 determines whether the image signal is within a predetermined noise range for each target pixel which noise reduction processing is performed. The results of the determination as to whether each image signal is within the noise range, and information concerning the noise range are transferred to the noise reducing unit 112. Based on the determination results of the noise determining unit 111 and the noise range, the noise reducing unit 112 performs a noise reduction process on the image signal in the image buffer 107, and then sends a noise reduced image signal to the signal processing unit 113. The processes of the noise determining unit 111 and the noise reducing unit 112 are performed in synchronization with each other by a unit of pixel under the control of the control unit 115. After completing the noise reduction processing of a predetermined number of pixels, for example, 8×8 pixels, the signal processing unit 113 under the control of the control unit 115 performs universally known enhancement process, compression process and the like. The processed image signal is then successively sent to the output unit 114. The output unit 114 stores the image signal onto a memory card or the like.

FIG. 2 illustrates one example of the configuration of the noise determining unit 111. The noise determining unit 111 includes a first noise estimating unit 200, a second noise estimating unit 201, an amplitude value setting unit 202, an amplitude value correction unit 203 and an examining unit 204. The image buffer 107 connects to each of the first noise estimating unit 200, the second noise estimating unit 201, and the examining unit 204. The first noise estimating unit 200 connects to the amplitude value setting unit 202, and the noise reducing unit 112. The second noise estimating unit 201 connects to the amplitude value correction unit 203. The amplitude value setting unit 202 connects to the amplitude value correction unit 203, and the amplitude value correction unit 203 connects to the examining unit 204 and the noise reducing unit 112. The examining unit 204 connects to the noise reducing unit 112. The control unit 115 connects to each of the first noise estimating unit 200, the second noise estimating unit 201, the amplitude value setting unit 202, the amplitude value correction unit 203, and the examining unit 204 so as to bidirectionally transmit and receive signals to and from each of these units.

Under the control of the control unit 115, each of the first noise estimating unit 200 and the second noise estimating unit 201, as estimating means, successively reads, from the image buffer 107, an image signal of a local region having a predetermined size containing a target pixel, for example, an image signal of the local area of a unit of 3×3 pixels in this embodiment.

FIG. 3 illustrates a plurality of pixels in the local region of a unit of 3×3 pixels. The local region includes a target pixel $P_{11}$ and surrounding pixels $P_{00}$, $P_{10}$, $P_{20}$, $P_{01}$, $P_{21}$, $P_{02}$, $P_{12}$, and $P_{22}$. The first noise estimating unit 200 estimates an amount $N_R$ of random noise related to the target pixel, and the second noise estimating unit 201 estimates an amount $N_S$ of spike noise related to the target pixel. The first noise estimating unit 200 transfers the estimated random noise amount $N_R$ and the related information which are an average value $AV_A$ of a plurality of image signals in the local region and the like, to the amplitude value setting unit 202 and the noise reducing unit 112. The second noise estimating unit 201 transfers the estimated spike noise amount $N_S$ to the amplitude value correction unit 203. Using the following equation (1), the amplitude value setting unit 202 as amplitude setting means, under the control of the control unit 115, calculates noise range Range in a real space from the random noise amount $N_R$ and the average value $AV_A$ of the plurality of image signals in the local region from the first noise estimating unit 200.

$$\text{Range} = AV_A \pm N_R \quad \text{Equation (1)}$$

The data of the calculated noise range Range is transferred to the amplitude value correction unit 203. Under the control of the control unit 115, the amplitude value correction unit 203 as amplitude value correction means corrects the noise range Range from the amplitude value setting unit 202 based on the spike noise amount $N_S$ from the second noise estimating unit 201, using the following equation (2). The amplitude value setting unit 202 and the amplitude value correction unit 203 constitute range calculating means.

$$\text{Range}' = AV_A \pm f(N_S)N_R = AV_A \pm kN_R \quad \text{Equation (2)}$$

In equation (2), f( ) is a function for calculating a correction coefficient k for the spike noise amount $N_S$, and for example, a monotonically increasing function that outputs 1.0 in response to $N_S=0$ as shown in FIG. 4. Related information, such as the corrected noise range Range' and the corrected random noise amount $kN_R$, is transferred to the examining unit 204 and the noise reducing unit 112. Under the control of the control unit 115, the examining unit 204 as examining means extracts a target pixel from the image buffer 107 and determines whether the image signal of the target pixel is within the corrected noise range Range'. One of three answers can be possible to the determination: "the image signal is within the corrected noise range Range'," "the image signal is above the corrected noise range Range'," and "the image signal is below the corrected noise range Range'." The determination result is transferred to the noise reducing unit 112. The control unit 115 sequentially performs the abovementioned process for all pixels in the image buffer 107.

FIG. 5 illustrates one example of the configuration of the first noise estimating unit 200. The first noise estimating unit 200 includes an extracting unit 300, a buffer 301, an average calculating unit 302, a gain calculating unit 303, a standard value providing unit 304, a coefficient calculating unit 305, a parameter ROM 306, a function calculating unit 307, and a noise memory unit 308. The image buffer 107 is connected to the average calculating unit 302 via the extracting unit 300 and the buffer 301. Each of the average calculating unit 302, the gain calculating unit 303, the standard value providing unit 304 and the parameter ROM 306 connects to the coefficient calculating unit 305. The coefficient calculating unit 305 connects to the function calculating unit 307, and the function calculating unit 307 connects to each of the noise memory unit 308, the amplitude value setting unit 202, and the noise reducing unit 112. The noise memory unit 308 connects to each of the amplitude value setting unit 202 and the noise reducing unit 112. The control unit 115 connects to each of the extracting unit 300, the average calculating unit 302, the gain calculating unit 303, the standard value providing unit 304, the coefficient calculating unit 305, the function calculating unit 307, and the noise memory unit 308 so as to bidirectionally transmit and receive signals to and from each of these units.

Under the control of the control unit 115, the extracting unit 300 as extracting means extracts the image signal of the local region at a predetermined position and having a predetermined size from the image buffer 107 and transfers the extracted image signal to the buffer 301. In accordance with the present embodiment, the extracting unit 300 extracts the image signal while successively scanning the entire image of the local region composed of 3×3 pixels $P_{ij}$ (i=0-2, j=0-2) as shown in FIG. 3. The average calculating unit 302 reads the signal on the buffer 301 under the control of the control unit 115, calculates the average value $AV_A$ of the image signal of the local region in accordance with the following equation (3), and transfers the resulting average value $AV_A$ to the coefficient calculating unit 305.

$$AV_A = \Sigma P_{ij}/9 (i=0\text{-}2, j=0\text{-}2) \quad \text{Equation (3)}$$

The gain calculating unit 303 determines gain of the amplifier 105 based on the exposure condition such as the ISO sensitivity transferred from the control unit 115, and transfers the resulting gain to the coefficient calculating unit 305. The average calculating unit 302, the gain calculating unit 303 and the control unit 115 constitute parameter calculating means. Furthermore, the standard value providing unit 304 as the standard parameter value providing means transfers to the coefficient calculating unit 305 temperature information indicating a standard temperature value of the image pickup element. The standard value providing unit 304 is random noise calculating means. Based on the average value $AV_A$ from the average calculating unit 302, the gain from the gain calculating unit 303, and the temperature information from the standard value providing unit 304, the coefficient calculating unit 305 calculates a coefficient required to estimate the random noise amount $N_R$. The random noise amount $N_R$ is estimated using the calculated coefficient. This estimation is performed based on formulization of the random noise. FIGS. 6 and 7 illustrates the formulization of the random noise amount $N_R$. FIG. 6 is a graph of plotting the random noise amount $N_R$ with respect to a signal level. The noise amount $N_R$ is approximated using a function of power of the average value $AV_A$ or a second order function of the average value $AV_A$. If the signal level is the average value $AV_A$, the random noise amount $N_R$ is formulized using one of equation (4) and equation (5).

$$N_R = A \cdot AV_A^B + C \qquad \text{Equation (4) or}$$

$$N_R = A \cdot AV_A^2 + B \cdot AV_A + C \qquad \text{Equation (5)}$$

where coefficients A, B and C are constant terms. The noise amount varies due to not only the signal level but also temperature and gain of the image pickup element for each shooting operation. FIG. 7 is a graph of plotting a noise amount with respect to the signal level, temperature, and gain. FIG. 7 illustrates three-dimensional function with axes represented by the values of the signal level, temperature and gain, and indicates that the noise amount also varies in response to gain. Each curve reflects equation (4) or equation (5). The coefficients therein become different depending on the temperature and the gain of the image pickup element. In consideration of the abovementioned, if the model is formulized with the temperature T and the gain G as parameters, the random noise amount $N_R$ is represented by equation (6) or equation (7).

$$N_R = a(T,G) \cdot AV_A^{b(T,G)} + c(T,G) \qquad \text{Equation (6) or}$$

$$N_R = a(T,G) \cdot AV_A^2 + b(T,G) \cdot AV_A + c(T,G) \qquad \text{Equation (7)}$$

where a( ), b( ), and c( ) are functions having temperature T and gain G as parameters. FIGS. 8, 9, and 10 are graphs illustrating characteristics of three functions a( ), b( ) and c( ) in equation (6). These three functions output the coefficient values A, B and C in response to input parameters of temperature T and gain G.

These functions can be easily obtained by measuring beforehand characteristics of image pickup element system. The above three functions a( ), b( ) and c( ) are recorded onto the parameter ROM 306.

The coefficient calculating unit 305 calculates the coefficients A, B and C in response to the temperature T and the gain G as input parameters and based on the three functions recorded on the parameter ROM 306, and transfers the calculated coefficients A, B and C to the function calculating unit 307. The coefficient calculating unit 305 and the parameter ROM 306 constitute coefficient calculating means. The function calculating unit 307 as function calculating means calculates the random noise amount $N_R$ in accordance with equation (6) or equation (7), and transfers the calculated random noise amount $N_R$ along with the average value $AV_A$ of the local region of equation (3) to the amplitude value setting unit 202 and the noise reducing unit 112.

It is not necessary to determine the parameters such as the temperature T and the gain G at every shooting operation. It is also possible to construct the system such that standard values relating arbitrary parameters are stored in the standard value providing unit 35, and the calculation processing is omitted. As a result, it is possible to achieve a high speed processing, a saving of power and the like.

The coefficient calculating unit 305, the parameter ROM 306, and the function calculating unit 307 constitute random noise amount calculating means.

Under the control of the control unit 115, the function calculating unit 307 transfers the random noise amount $N_R$ and the average value $AV_A$ of the local region to the noise memory unit 308 for temporal storing. The control unit 115 controls the function calculating unit 307 to calculate the random noise amount $N_R$ at predetermined pixel intervals. If the random noise amount $N_R$ is not to be calculated, the random noise amount $N_R$ on the noise memory unit 308 is transferred to the amplitude value setting unit 202 and the noise reducing unit 112. The control unit 115 constitutes selecting means for selecting between calculating a new random noise amount and using the abovementioned random noise amount on the noise memory unit 308. As a result, further a high speed processing and a saving of power can be achieved.

FIG. 11 illustrates one example of the configuration of the second noise estimating unit 201. The second noise estimating unit 201 includes an extracting unit 400, a buffer 401, a comparing unit 402, an average calculating unit 403, and a difference calculating unit 404. The image buffer 107 connects to each of the comparing unit 402, the average calculating unit 403, and the difference calculating unit 404 via the extracting unit 400 and the buffer 401. The average calculating unit 403 connects to the amplitude value correction unit 203 via the difference calculating unit 404. The control unit 115 connects to each of the extracting unit 400, the comparing unit 402, the average calculating unit 403, and the difference calculating unit 404 in order to bidirectionally transmit and receive signals to and from each of these units.

Under the control of the control unit 115, the extracting unit 400 as extracting means extracts the image signal of the local region at the predetermined position and having the predetermined size from the image buffer 107, and transfers the extracted image signal to the buffer 401. In the present embodiment, the extracting unit 400 extracts the image signal while scanning the entire image of the local region composed of 3×3 pixels $P_{ij}$ (i=0-2, j=0-2) as shown in FIG. 3. The comparing unit 402 as spike noise examining means compares the target pixel $P_{11}$ with each of surrounding pixels $P_{10}$, $P_{12}$, $P_{01}$, and $P_{21}$ above, below, and to the left and to the right of the target pixel $P_{11}$. If the target pixel $P_{11}$ is larger than or smaller than any of the surrounding pixels $P_{10}$, $P_{12}$, $P_{01}$, and $P_{21}$ above, below, and to the left and to the right of the target pixel $P_{11}$, the image signal of the target pixel $P_{11}$ is determined to contain a spike noise component.

$$P_{11} > P_{10} \text{ and } P_{11} > P_{12} \text{ and } P_{11} > P_{01} \text{ and } P_{11} > P_{21} \qquad \text{Equation (8)}$$

$$P_{11} < P_{10} \text{ and } P_{11} < P_{12} \text{ and } P_{11} < P_{01} \text{ and } P_{11} < P_{21} \qquad \text{Equation (9)}$$

In other words, if the image signal of the target pixel $P_{11}$ fails to satisfy one of equation (8) and equation (9), the image signal is determined to contain no spike noise. The determination result is transferred to the control unit 115. If the image signal of the target pixel $P_{11}$ is determined to contain no spike noise component, the control unit 115 controls the difference calculating unit 404 to output zero as a spike noise amount $N_S$ to the amplitude value correction unit 203. If the image signal of the target pixel $P_{11}$ is determined to contain a spike noise component, the control unit 115 causes the average calculating unit 403 to operate.

Under the control of the control unit 115, the average calculating unit 403 as average calculating means reads from the image buffer 107 the pixels $P_{00}$, $P_{10}$, $P_{20}$, $P_{01}$, $P_{21}$, $P_{02}$, $P_{12}$, and $P_{22}$ surrounding the target pixel $P_{11}$, and calculates the average value $AV_N$ Of the surrounding pixels from the following equation (10).

$$AV_N = \Sigma P_{ij}/8 \ (i=0-2, j=0-2 \text{ with } P_{11} \text{ excluded}). \quad \text{Equation (10)}$$

In other words, the pixels $P_{00}$, $P_{10}$, $P_{20}$, $P_{01}$, $P_{21}$, $P_{02}$, $P_{12}$, and $P_{22}$ excluding the target pixel $P_{11}$ from among the image signals of the local area are calculated to determine the average value $AV_N$. The average value $AV_N$ of the surrounding pixels of equation (10) is transferred to the difference calculating unit 404. When the comparing unit 402 as the determining means under the control of the control unit 115 determines that the image signal of the target pixel $P_{11}$ contains a spike noise component, the difference calculating unit 404 as difference calculating means receives the average value $AV_N$ of the surrounding pixels from the average calculating unit 403 and calculates the absolute value of difference between the target pixel $P_{11}$ extracted from the image buffer 107 and the average value $AV_N$ of the surrounding pixels, as the spike noise amount $N_S$ in accordance with the following equation (11). The average calculating unit 403 and the difference calculating unit 404 constitute spike noise calculating means.

$$N_S = |AV_N - P_{11}| \quad \text{Equation (11)}$$

The spike noise amount $N_S$ of equation (11) is transferred to the amplitude value correction unit 203.

FIG. 12 illustrates one example of the configuration of the noise reducing unit 112. The noise reducing unit 112 includes an extracting unit 500, a buffer 501, a selecting unit 502, a first smoothing unit 503 and a second smoothing unit 504. The image buffer 107 connects to each of the first smoothing unit 503 and the second smoothing unit 504 via the extracting unit 500, the buffer 501 and the selecting unit 502. Each of the first smoothing unit 503 and the second smoothing unit 504 connects to the signal processing unit 113. The noise determining unit 111 connects to each of the selecting unit 502, the first smoothing unit 503, and the second smoothing unit 504. The control unit 115 connects to each of the extracting unit 500, the selecting unit 502, the first smoothing unit 503 and the second smoothing unit 504 so as to bidirectionally transmit and receive signals to and from each of these units. Under the control of the control unit 115, the extracting unit 500 extracts the local region at a predetermined position and having a predetermined size from the image buffer 107 and transfers the extracted local region to the buffer 501.

In accordance with the present embodiment, the extracting unit 500 extracts the local region in synchronization with the noise determining unit 111 while successively scanning the entire image of the local region composed of 3×3 pixels $P_{ij}$ (i=0-2, j=0-2) as shown in FIG. 3. Based on the determination result from the noise determining unit 111, the selecting unit 502 transfers the image signal of the local region on the buffer 501 to one of the first smoothing unit 503 and the second smoothing unit 504 as smoothing means. The determination result from the noise determining unit 111 is one of three cases, namely, "the image signal is within the noise range," "the image signal is above the noise range," and "the image signal below the noise range." If the average value $AV_A$ of the target pixel $P_{11}$ "is within the noise range," the image signal is transferred to the first smoothing unit 503, and otherwise, the image signal is transferred to the second smoothing unit 504.

The first smoothing unit 503 substitutes the average value $AV_A$ of the local region from the noise determining unit 111 for the target pixel $P_{11}$ in accordance with the following equation (12). In other words, the first smoothing unit 503 performs a smoothing process to the target pixel determined to fall within the noise range to absorb an amplitude component corresponding to the noise range.

$$P_{11}' = AV_A \quad \text{Equation (12)}$$

On the other hand, if the average value $AV_A$ of the target pixel $P_{11}$ is "above the noise range," the second smoothing unit 504 corrects the target pixel $P_{11}$ in accordance with equation (13) based on the corrected random noise amount $kN_R$ from the noise determining unit 111. The second smoothing unit 504 performs an amplitude component correction process on the target pixel determined to be above the noise range.

$$P_{11}' = P_{11} - kN_R/2 \quad \text{Equation (13)}$$

If the average value $AV_A$ of the target pixel $P_{11}$ is "below the noise range," the second smoothing unit 504 corrects the target pixel $P_{11}$ in accordance with equation (14) based on the corrected random noise amount $kN_R$ from the noise determining unit 111.

$$P_{11}' = P_{11} + kN_R/2 \quad \text{Equation (14)}$$

The image signal of the target pixel $P_{11}'$ subsequent to the process of one of equation (12), equation (13) and equation (14) is successively output to the signal processing unit 113.

With the above-mentioned configuration, the determination process of determining whether the target pixel is within the noise range for each pixel, and the noise reduction process are performed. Therefore, the image processing apparatus performing the optimum noise reduction is provided. More specifically, two different types of noise amounts are estimated for each pixel, and the noise ranges of the two types of noise amounts are set. Highly accurate determination can be performed on a variety of noise. The optimum noise reduction process free from edge blurring is thus performed.

Furthermore, various types of parameters such as the signal level, the temperature, the shutter speed, the gain and the like are determined dynamically for each shooting operation, and the amount of random noise can be estimated on the basis of these parameters. Even if parameters required for shooting are not available, a random noise amount can be estimated, and stable noise reduction effect is achieved.

Furthermore, since the function is used to calculate the random noise amount, the required amount of memory is small, so that costs can be reduced. By intentionally omitting part of parameter calculation, and using the previously estimated random noise amount, it is possible to reduce costs and save power.

On the other hand, the spike noise is calculated on a target pixel that has been determined to contain a spike noise component based on the comparison process performed with surrounding pixels in the simply way. Unnecessary calculation is eliminated, and an efficient and high-speed system is thus provided. Since the noise reduction process is performed on a real space, system implementation is relatively easy with low cost.

Since the same noise reduction process is performed on two different types of noise, discontinuity is prevented from occurring, and high-quality image results.

The estimation of the noise amount and the noise reduction process are performed on a unit of 3×3 pixels in the present embodiment, but the present invention is not limited to this arrangement. For example, the processes may be performed on a unit of 2×2 pixels or smaller. Although accuracy level is lowered in this case, a high-speed process is performed. Alternatively, the processes may be performed on a larger region of such as 5×5 pixels, 8×8 pixels, or more. In this case, the process speed is lowered but a high-accuracy noise estimation process is performed. Alternatively, the noise amount estimation process and the noise reduction process may be performed on different local region sizes.

In the above-referenced embodiment, the temperatures of the image pickup element is represented by the average value. The present invention is not limited to this method. For example, temperature may be actually measured using a temperature sensor. In this way, the accuracy of the noise amount estimation is increased.

Second Embodiment

Next, a second embodiment of the present invention is described below. In the second embodiment, a color filter 600, a pre-white balance (hereinafter referred to as PreWB) unit 601, and a separating unit 602 are added to the configuration of the first embodiment. The basic configuration of the second embodiment is identical to that of the first embodiment, and the same elements are designated with the same reference numerals, and the discussion thereof is omitted herein. Difference only is discussed below.
(Construction)

Figure 13:
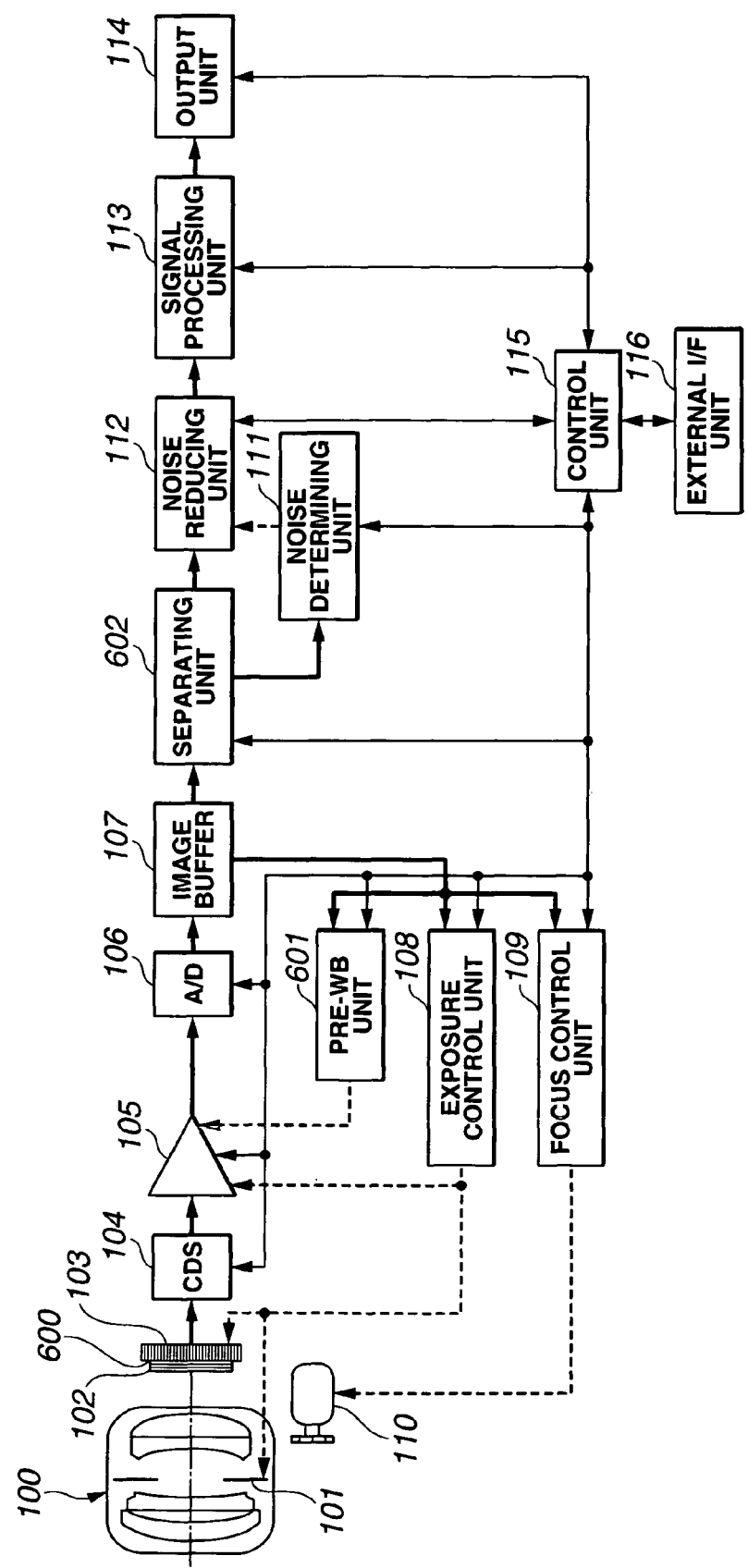
FIG. 13 is a block diagram illustrating an image pickup system in accordance with a second embodiment of the present invention.
Figures 14, 15:
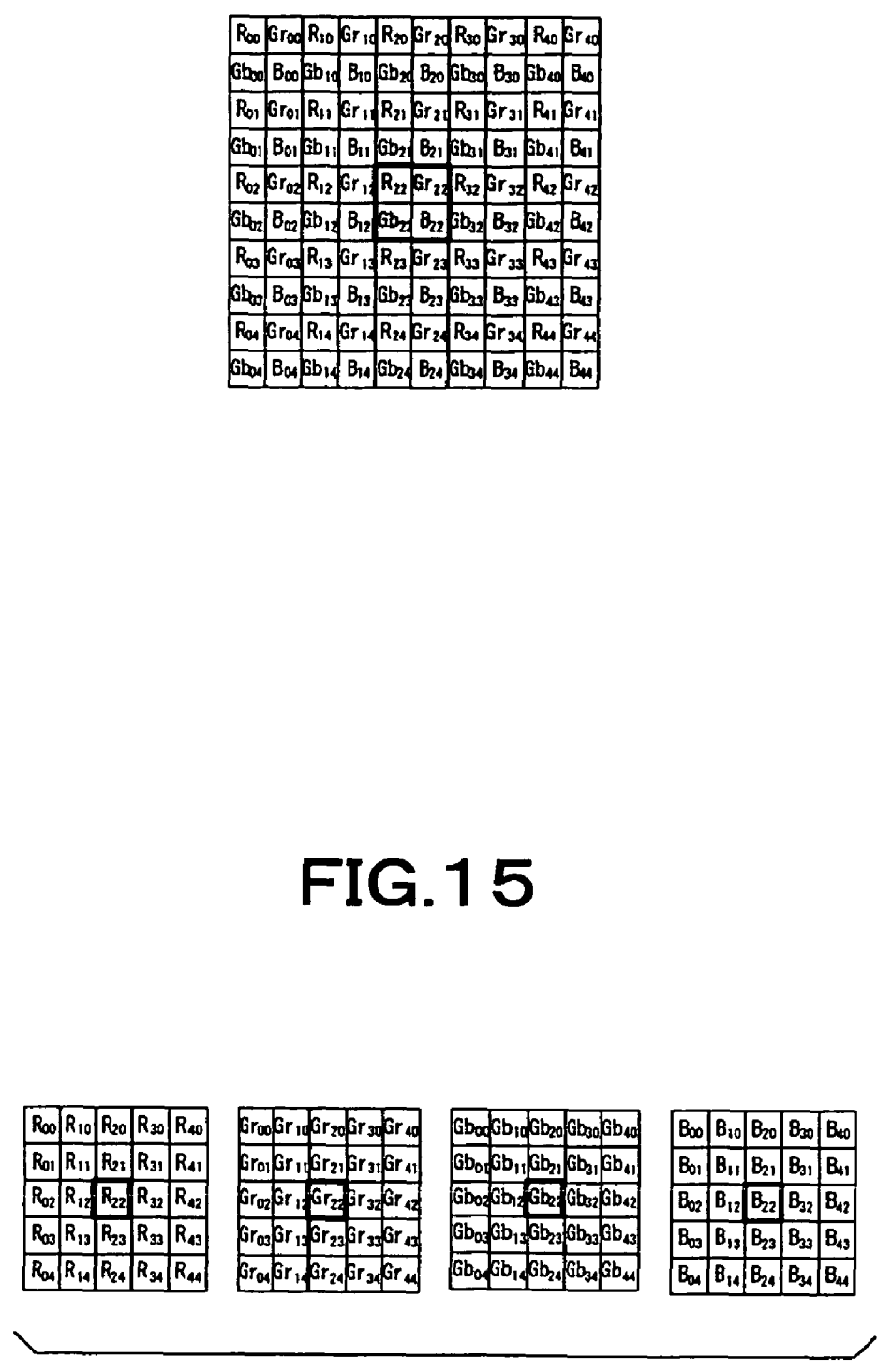
Figure 16:
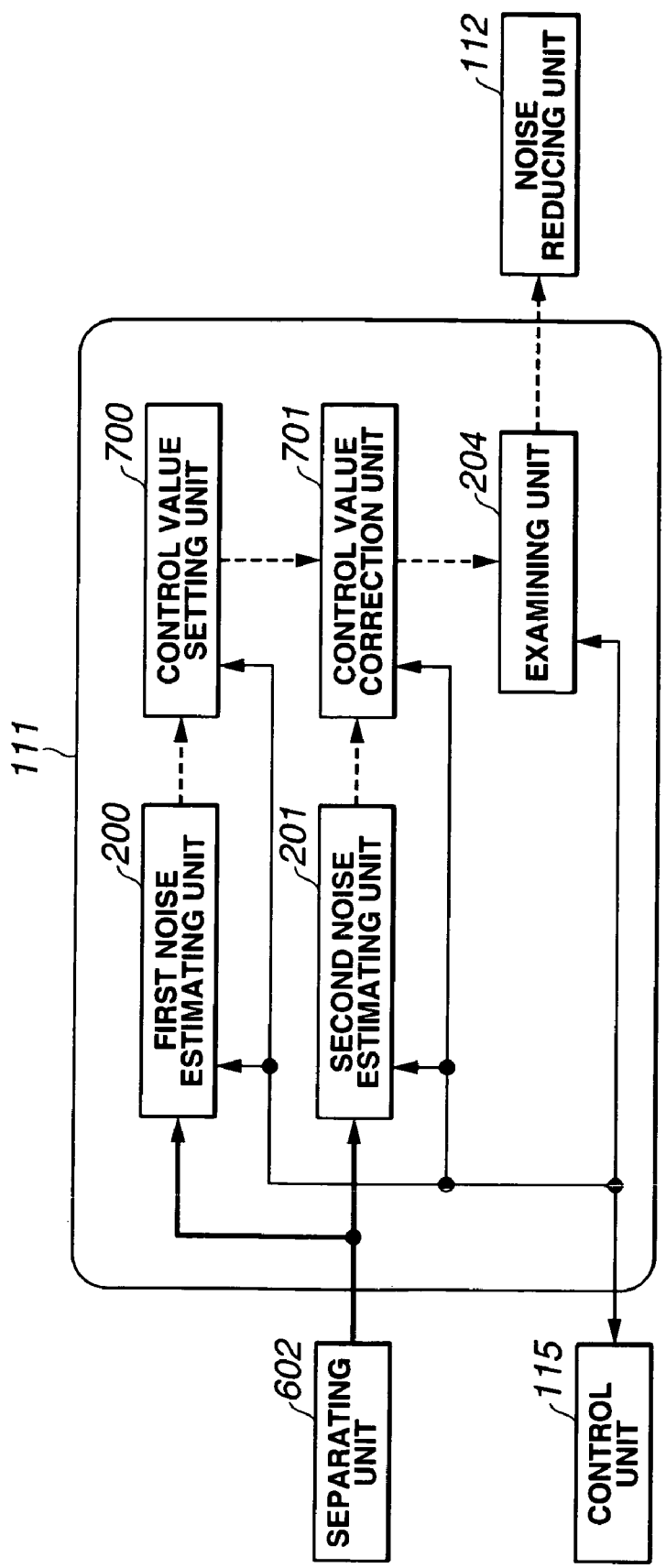
FIG. 16 is a block diagram illustrating a noise determining unit in accordance with the second embodiment of the present invention.
Figure 17:
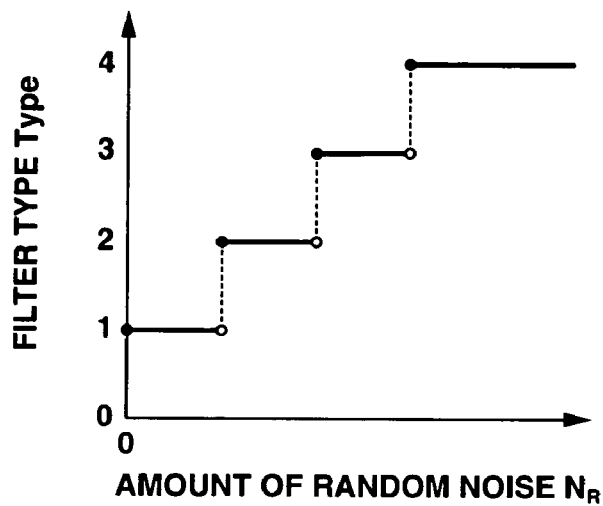
FIG. 17 is an explanatory diagram illustrating a function for use in calculating a type of filter as a control value in accordance with the second embodiment of the present invention.
Figure 18:
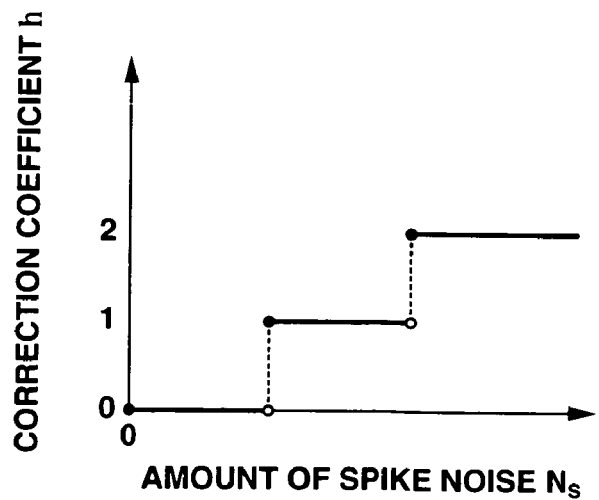
FIG. 18 is an explanatory diagram illustrating a function for use in calculating a correction coefficient as a control value in accordance with the second embodiment of the present invention.
Figure 19:
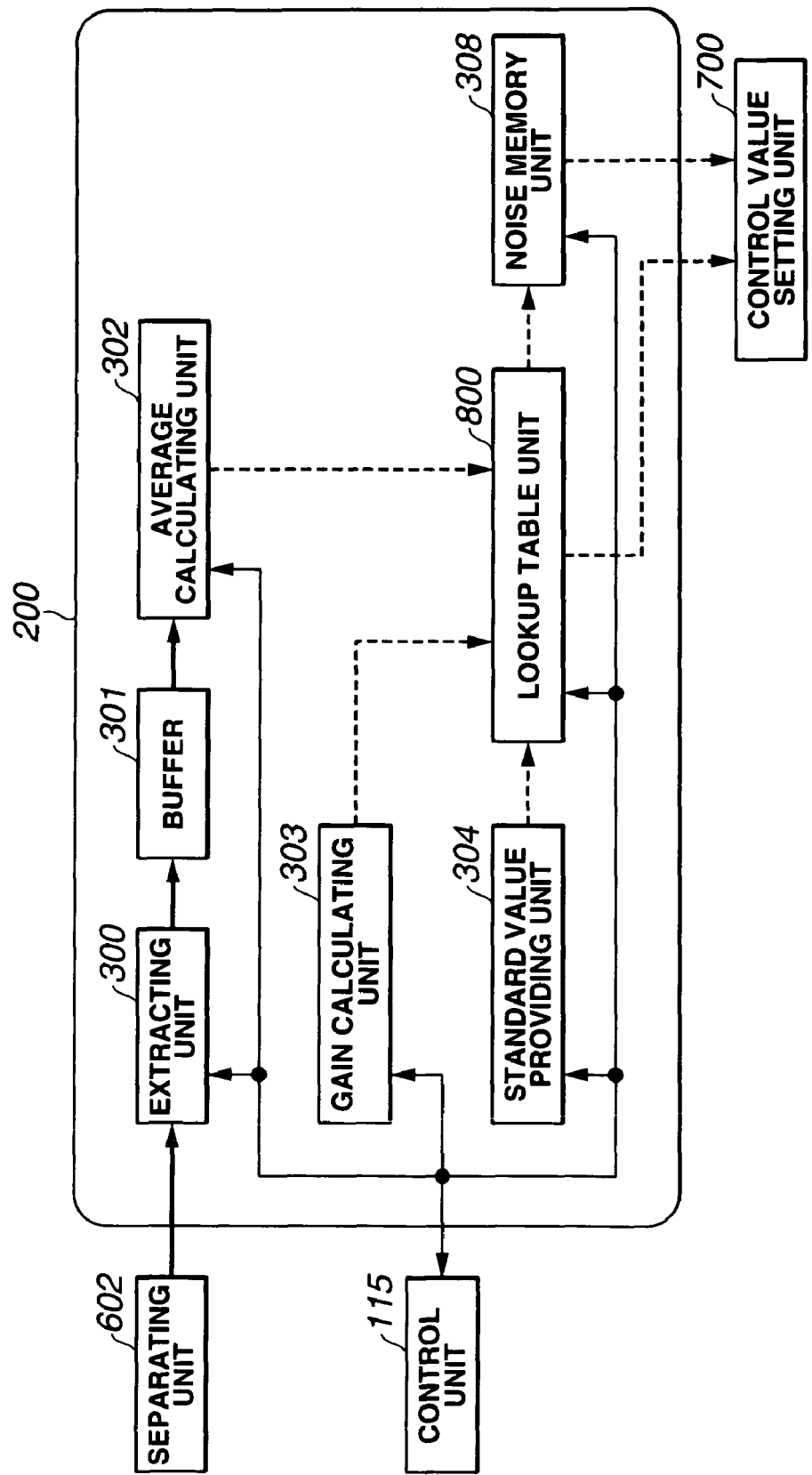
FIG. 19 is a block diagram illustrating a first noise estimating unit in accordance with the second embodiment of the present invention.
Figure 20:
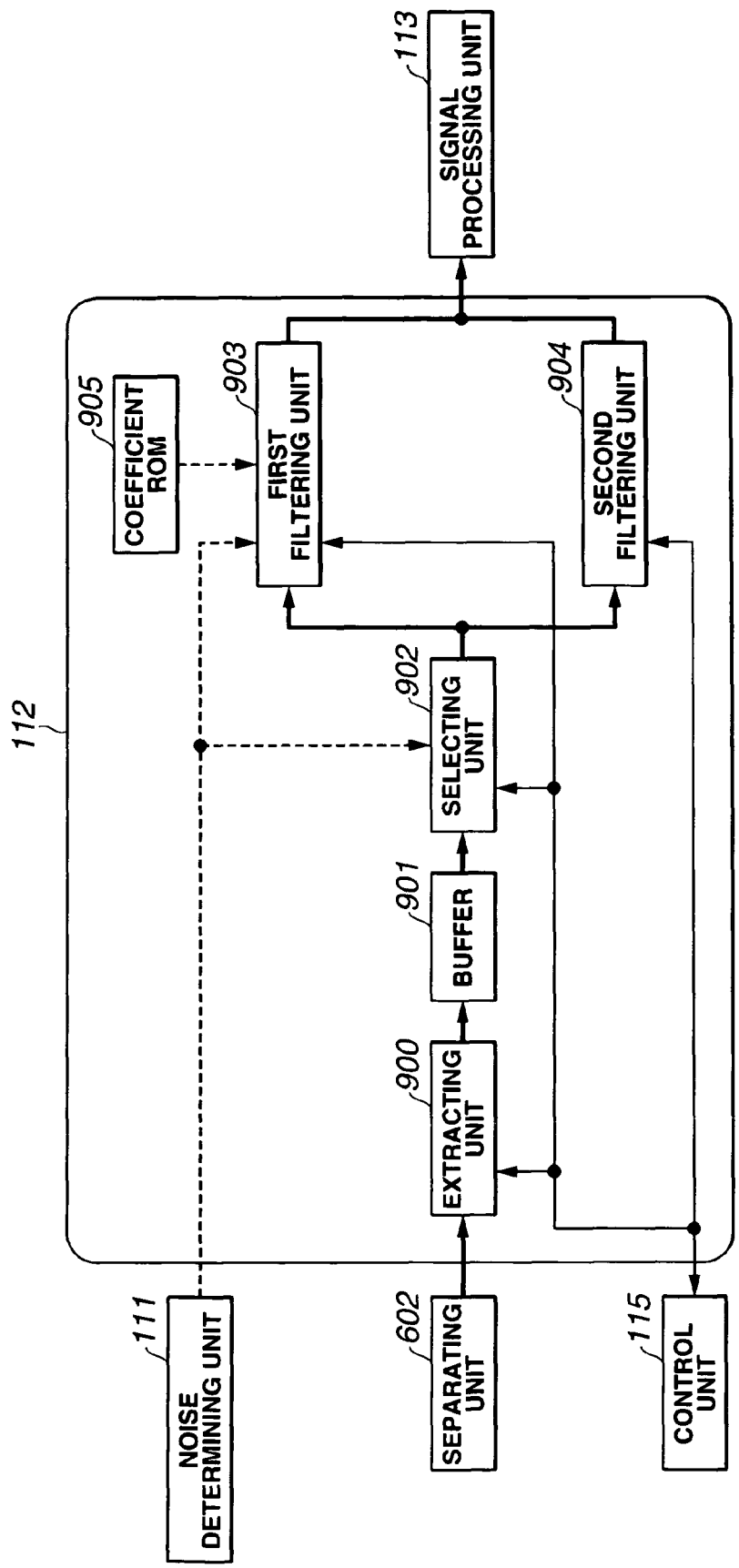
FIG. 20 is a block diagram illustrating a noise reducing unit in accordance with the second embodiment of the present invention.

FIG. 13 is a block diagram of an image pickup system of the second embodiment of the present invention. FIGS. 14 and 15 illustrate separation of color signals in accordance with the present embodiment. FIG. 16 is a block diagram illustrating a noise determining unit in accordance with the present embodiment. FIGS. 17 and 18 illustrate a function for use in calculating a control value. FIG. 19 is a block diagram illustrating a first noise estimating unit of the present embodiment. FIG. 20 is a block diagram illustrating a noise reducing unit of the present embodiment.

As shown in FIG. 13, the color filter 600 is arranged in front of the CCD 103. The image buffer 107 connects to the pre-WB unit 601, and the pre-WB unit 601 connects to the amplifier 105. The image buffer 107 also connects to the separating unit 602 as separating means, and the separating unit 602 connects to each of the noise determining unit 111 and the noise reducing unit 112. The control unit 115 connects to each of the pre-WB unit 601 and the separating unit 602 so as to bidirectionally transmit and receive signals to and from each of these units.
(Function)

The basic function of the second embodiment is generally identical to that of the first embodiment, and only difference therebetween is discussed herein. The signal flow of the system of FIG. 13 is described below. The pre shooting mode is entered by half pressing the shutter button. The image signal obtained as a result of shooting via the optical system 100, the aperture 101, the low-pass filter 102, the color filter 600 and the CCD 103 is transferred to the image buffer 107. In this embodiment, the CCD 103 is a single CCD having a primary color filter. The color filter 600 employs a Bayer-type arrangement shown in FIG. 14. In the primary color Bayer type, red (R), green (Gr, Gb), and blue (B) filters are arranged with 2×2 pixels as a base unit. The green filters identical to each other are referred to as Gr and Gb for convenience of processing in the present embodiment.

The image signal on the image buffer 107 is transferred to the pre-WB unit 601. The pre-WB unit 601 calculates a brief white balance coefficient by accumulating each color signal by a signal with a specified luminance level in the image signal. The brief white balance coefficient is then transferred to the amplifier 105. The amplifier 105 performs a white balance processing by multiplying each color signal by a different gain using the brief white balance coefficient.

When the real shooting operation is performed next, the image signal is transferred to the image buffer 107 in the same way as in the pre shooting mode. The real shooting operation is performed based on the exposure condition determined by the exposure control unit 108, the focus condition determined by the focus control unit 109, and the white balance coefficient determined by the pre-WB unit 601. These shooting conditions are transferred to the control unit 115. The image signal on the image buffer 107 is transferred to the separating unit 602 for each local region unit having a predetermined size, for example, 10×10 pixel unit as shown in FIG. 14.

The separating unit 602 separates the image signal on the image buffer 107 into units of 5×5 pixels for each color filter of four types R, Gr, Gb, and B as shown in FIG. 15. The separation process is performed under the control of the control unit 115 in synchronization with the process of the noise determining unit 111 and the noise reducing unit 112. The color signals processed by the noise reducing unit 112 are mixed and then transferred to the signal processing unit 113. Under the control of the control unit 115, the signal processing unit 113 performs universally known interpolation process, enhancement process, compression process and the like on the noise reduced image signal, and then transfers the resulting image signal to the output unit 114. The output unit 114 stores the signal onto a memory card or the like.

FIG. 16 illustrates one example of the configuration of the noise determining unit 111. The noise determining unit 111 includes a first noise estimating unit 200, a second noise estimating unit 201, a control value setting unit 700, a control value correction unit 701, and an examining unit 204. The basic configuration of the noise determining unit 111 is identical to that of the first embodiment of FIG. 2. The same elements are designated with the same reference numerals, and the discussion thereof is omitted herein. The separating unit 602 connects to each of the first noise estimating unit 200 and the second noise estimating unit 201. The first noise estimating unit 200 connects to the control value setting unit 700, and the second noise estimating unit 201 connects to the control value correction unit 701. The control value setting unit 700 connects to the control value correction unit 701, and the control value correction unit 701 connects to the examining unit 204. The examining unit 204 connects to the noise reducing unit 112. The control unit 115 connects to each of the first noise estimating unit 200, the second noise estimating unit 201, the control value setting unit 700, the control value correction unit 701, and the examining unit 204 so as to bidirectionally transmit and receive signals to and from each of these units.

Under the control of the control unit 115, the first noise estimating unit 200 and the second noise estimating unit 201 read, for each color signal, the image signal of the local region having a predetermined size containing a target pixel from the separating unit 602. In accordance with the present embodiment, image signals of the local region of a 5×5-pixel unit containing four pixels of interest $R_{22}$, $Gr_{22}$, $Gb_{22}$, and $B_{22}$ of respective four types of color signals R, Gr, Gb, and B shown in FIG. 15 are successively read.

The first noise estimating unit 200 estimates the random noise amount $N_R$ of the target pixel using a lookup table, and the second noise estimating unit 201 estimates the spike noise amount $N_S$ of the target pixel in a method similar to the method of the first embodiment. The first noise estimating unit 200 transfers the estimated random noise amount $N_R$ to the control value setting unit 700. The second noise estimating unit 201 transfers the estimated spike noise amount $N_S$ to the control value correction unit 701. The control value setting unit 700 as control value setting means, under the control of the control unit 115, calculates a noise control value Cnt from the random noise amount $N_R$ from the first noise estimating unit 200 in accordance with the following equation (15). The control value setting unit 700 and the control value correction unit 701 constitute range calculating means.

$$Cnt = g(N_R) \quad \text{Equation (15)}$$

In equation (15), g( ) is an identification function identifying a filter type Type in a frequency space of the random noise amount $N_R$. According to the identification function, the random noise amount $N_R$ is divided into a plurality of ranges, for example, four ranges as shown in FIG. 17, and the four ranges are assigned respective filter types Type=1-4. In frequency characteristics of filter, a property of cutting off frequency component is intensified as the value of the filter type Type increases.

The calculated noise control value Cnt is transferred to the control value correction unit 701. Under the control of the control unit 115, the control value correction unit 701 as control value correction means corrects the noise control value Cnt from the control value setting unit 700 in response to the spike noise amount $N_S$ from the second noise estimating unit 201 in accordance with the following equation (16).

$$Cnt' = Cnt + h(N_S) = Cnt + h \quad \text{Equation (16)}$$

In equation (16), h( ) is a correction function providing a correction coefficient h to the spike noise amount $N_S$. According to the correction function, the spike noise amount $N_S$ is divided into a plurality of ranges, for example, three ranges as shown in FIG. 18, and the three ranges are assigned respective correction coefficients h=0-2. In the correction of equation (16), the maximum value of the noise control value Cnt' is the maximum value of the filter type, namely, 4 in the present embodiment, and when the maximum value of the noise control value Cnt' is above 4, that maximum value is used.

The corrected noise control value Cnt' is transferred to each of the examining unit 204 and the noise reducing unit 112. The examining unit 204 under the control of the control unit 115 determines from the corrected noise control value Cnt' from the control value correction unit 701 whether the target pixel is within the noise range. Two determination results are available, namely, if Cnt'=1, the image signal of the target pixel is "out of the noise range," and otherwise, the image signal of the target pixel is "within the noise range." The determination result is transferred to the noise reducing unit 112. The control unit 115 performs the determination process on all pixels on the image buffer 107.

FIG. 19 illustrates an example of the configuration of the first noise estimating unit 200. The first noise estimating unit 200 includes an extracting unit 300, a buffer 301, an average calculating unit 302, a gain calculating unit 303, a standard value providing unit 304, a noise memory unit 308, and a lookup table unit 800. The basic configuration of the first noise estimating unit 200 remains unchanged from the one in the first embodiment of FIG. 5, and the same elements are designated with the same reference numerals, and the discussion thereof is omitted herein.

The separating unit 602 connects to the average calculating unit 302 via the extracting unit 300 and the buffer 301. Each of the average calculating unit 302, the gain calculating unit 303, and the standard value providing unit 304 connects to the lookup table unit 800. The lookup table unit 800 as lookup table means connects to each of the noise memory unit 308 and the control value setting unit 700. The noise memory unit 308 as memory means connects to the control value setting unit 700. The control unit 115 connects to each of the extracting unit 300, the average calculating unit 302, the gain calculating unit 303, the standard value providing unit 304, the noise memory unit 308 and the lookup table unit 800 so as to bidirectionally transmit and receive signals to and from each of these units.

The extracting unit 300 under the control of the control unit 115 extracts from the separating unit 602 an image signal of a local region, relating to a predetermined color signal, at a predetermined position and having a predetermined size and transfers the image signal to the buffer 301. In this embodiment, the extracting unit 300 extracts the image signal while successively scanning an entire image in the local region composed of 5×5 pixels $C_{ij}$ (C=R, Gr, Gb, B, i=0-4, j=0-4) as shown in FIG. 15. Under the control of the control unit 115, the average calculating unit 302 reads a signal from the buffer 301, calculates an average value $AV_A$ of the local region, and transfers the calculated average value $AV_A$ as a signal value level to the lookup table unit 800. The lookup table unit 800 constitutes random noise amount calculating means.

$$AV_A = \Sigma C_{ij}/25 \, (i=0-4, j=0-4) \quad \text{Equation (17)}$$

The gain calculating unit 303 determines gain of the amplifier 105 based on information relating to the exposure condition such as the ISO sensitivity and the white balance coefficient transferred from the control unit 115, and then transfers the determined gain to the lookup table unit 800 as the lookup table means. The standard value providing unit 304 transfers standard temperature information of the image pickup element to the lookup table unit 800. The lookup table unit 800 is a table that records the relationship of temperature, signal value level, gain and random noise amount, and is constructed in the same way as described with reference to the first embodiment.

The random noise amount $N_R$ from the lookup table unit 800 is transferred to one of the control value setting unit 700 and the noise memory unit 308 under the control of the control unit 115. The control unit 115 performs control process to calculate the random noise amount $N_R$ at predetermined pixel intervals. If the random noise amount $N_R$ is not calculated, the random noise amount $N_R$ on the noise memory unit 308 is transferred to the control value setting unit 700. In this way, high-speed process and power saving are achieved.

FIG. 20 illustrates one example of the configuration of the noise reducing unit 112. The noise reducing unit 112 includes an extracting unit 900, a buffer 901, a selecting unit 902, a first filtering unit 903, a second filtering unit 904, and a coefficient ROM 905. The separating unit 602 connects to each of the first filtering unit 903 and the second filtering unit 904 via the extracting unit 900, the buffer 901, and the selecting unit 902. The first filtering unit 903 and the second filtering unit 904 are respectively connected to the signal processing unit 113. The coefficient ROM 905 connects to the first filtering unit 903. The noise determining unit 111 connects to each of the selecting unit 902 and the first filtering unit 903. The control unit 115 connects to each of the extracting unit 900, the selecting unit 902, the first filtering unit 903, and the second filtering unit 904 so as to bidirectionally transmit and receive signals to and from each of these units.

The extracting unit 900 under the control of the control unit 115 extracts from the separating unit 602 an image signal of a local region at a predetermined position and having a predetermined size, and transfers the image signal to the buffer 901. In the present embodiment, the extracting unit 900 extracts the image signal in synchronization with the noise determining unit 111 while successively scanning an entire image of the local region composed of 5×5 pixels $C_{ij}$ (C=R, Gr, Gb, B, i=0-4, j=0-4) as shown in FIG. 15.

Based on the determination result from the noise determining unit 111, the selecting unit 902 transfers the image signal of the local region on the buffer 901 to one of the first filtering unit 903 and the second filtering unit 904. One of two determination results is possible from the noise determining unit 111 wherein one determination is that the image signal of the target pixel is "out of the noise range," and the other determination result is that the image signal of the target pixel is "within the noise range." If the image signal of the target pixel is "within the noise range," the image signal is transferred to the first filtering unit 903. If the image signal is "out of the noise range," the image signal is transferred to the second filtering unit 904.

The first filtering unit 903 under the control of the control unit 115 reads the corrected noise control value Cnt' from the noise determining unit 111. In the present embodiment, Cnt'=1-4, and if the first filtering unit 903 is selected, Cnt' is within a range of 2-4. The coefficient ROM 905 stores, for each noise control value Cnt', a coefficient corresponding to a filter of the size of the local region, namely, 5×5 in this embodiment. The higher the noise control value Cnt', the stronger the property of cutting off a high frequency component in frequency characteristics becomes.

The first filtering unit 903 reads the filter coefficient corresponding to the noise control value Cnt' from the coefficient ROM 905, and performs a filtering process on the local region from the selecting unit 902. More specifically, the first filtering unit 903 and the coefficient ROM 905 constitute smoothing means for performing a smoothing process for absorbing a frequency component corresponding to the noise range in the target pixel that has been determined to be within the noise range. The processed result is then transferred to the signal processing unit 113.

On the other hand, the second filtering unit 904 as smoothing means under the control of the control unit 115 performs a filtering process on the local region from the selecting unit 902 with the filter coefficient corresponding to Cnt'=1. In this filter frequency characteristic, a property to cut off a high frequency component is most weakly set. The second filtering unit 904 performs a correction process to correct a frequency component on the target pixel that has been determined to be out of the noise range. The process result is transferred to the signal processing unit 113. The control unit 115 performs control process to repeat the above process for each color signal.

With the above arrangement, the determination process of determining whether the target pixel is within the noise range for each pixel, and the noise reduction process are performed. The image processing apparatus thus reduces noise in an optimum manner. More specifically, two different types of noise amounts are estimated for each pixel, and the noise ranges of the two types of noise amounts are set. Highly accurate determination can be performed on a variety of noise. The optimum noise reduction process free from edge blurring is thus performed. By dynamically estimating the random noise amount and the spike noise amount caused by the image pickup element, the image pickup system can reduce only a noise component in a manner free from the effect of shooting conditions.

Since the image signal is divided into the color signals for each color filter, the system is flexibly applicable to a variety of image pickup systems including a primary color system, a complementary color system, a single CCD system, a two CCD system, a three CCD system and the like. Furthermore, various types of parameters such as the signal level, the temperature, the shutter speed, the gain and the like are determined dynamically for each shooting operation, and the amount of random noise can be estimated on the basis of these parameters. Even if a parameter required for shooting is not available, a random noise amount can be estimated. Stable noise reduction effect is thus achieved. Since the table is used to calculate the random noise amount, high-speed process can be executed. By intentionally omitting part of parameter calculation, and using the previously estimated random noise amount, a low-cost and lower power consumption system is provided.

Since the noise reduction process is performed in frequency characteristics, the system is provided with a high degree of freedom in the control of the noise reduction process and ease of use. The estimation of the noise amount and the noise reduction process are performed on a unit of 5×5 pixels in the present embodiment, but the present invention is not limited to this arrangement. The processes may be performed on any size of local region. The above-described embodiment uses a primary color Bayer type single CCD, but the present invention is not limited to this arrangement. The present embodiment is applicable to a complementary color line-sequential system, or a two CCD system, or a three CCD system. The image processing apparatus is thus flexibly applicable to a variety of image pickup systems such as a primary color system, a complementary color system, a single CCD system, a two CCD system, and a three CCD system.

Third Embodiment

A third embodiment of the present invention is described below. The third embodiment relates to a playback system. The playback system of the third embodiment is configured by adding an input unit 1000 and a header information analyzing unit 1001 to the configuration of the first embodiment while removing from the configuration of the first embodiment the optical system 100, the aperture 101, the low-pass filter 102, the black-and-white CCD 103, the CDS circuit 104, the amplifier 105, the A/D converter 106, the exposure control unit 108, the focus control unit 109 and the AF motor 110. The basic arrangement for the noise reduction process is substantially identical to the first embodiment, and the same elements are designated with the same reference numerals, and the discussion thereof is omitted herein. Only difference from the first embodiment is described below.

Figure 21:
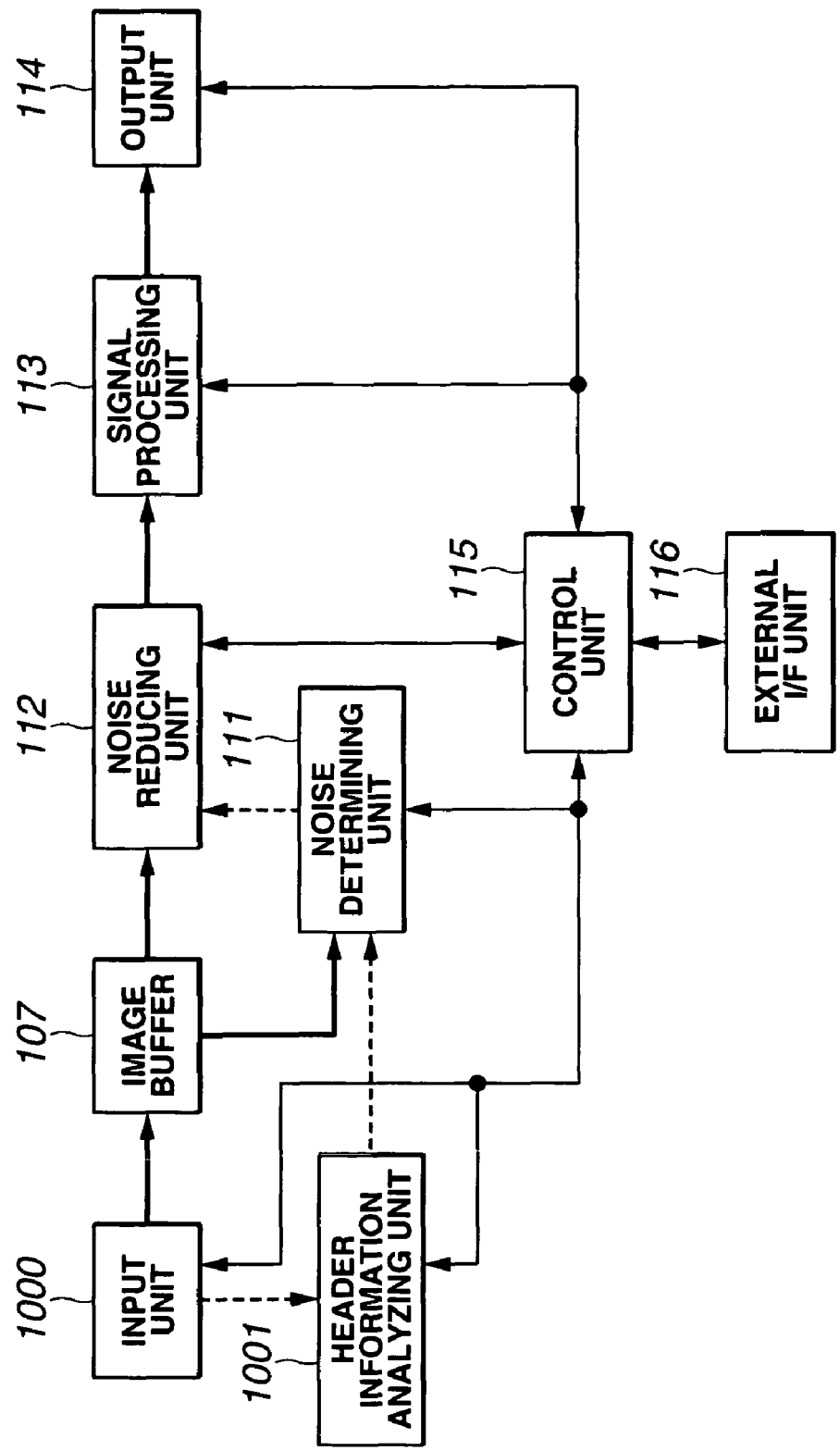
FIG. 21 is a block diagram illustrating a system in accordance with a third embodiment of the present invention.

FIG. 21 is a block diagram of a system of the third embodiment of the present invention.

(Configuration)

As shown in FIG. 21, an image signal and header information, stored on a recording medium such as a memory card, are read by the input unit 1000 and are then transferred respectively to the image buffer 107 and the header information analyzing unit 1001. The header information analyzing unit 1001 is connected to the noise determining unit 111. The control unit 115 connects to each of the input unit 1000 and the header information analyzing unit 1001 so as to bidirectionally transmit and receive signals to and from each of these units.

(Operation)

Signal flow of the system of FIG. 21 is described below. When a user performs a playback operation of an image signal using the external I/F unit 116 such as a mouse, and a keyboard, the input unit 1000 reads the image signal and the header information stored on a recording medium of a storage device. In the present embodiment, the image signal and the header information, stored on the recording medium, contain, respectively, a signal from the CCD 103 as unprocessed raw data, and information relating to the temperature and gain of the image pickup element from the control unit 115 of the first embodiment for each shooting operation. The image signal from the input unit 1000 is transferred to the image buffer 107 and the header information is transferred to the header information analyzing unit 1001.

The header information analyzing unit 1001 extracts, from the header information, information required to estimate noise amount, such as temperature and gain for each shooting operation and transfers the extracted information to the noise determining unit 111. The image signal on the image buffer 107 is also transferred to the noise determining unit 111. As in the first embodiment, the noise determining unit 111 determines for each pixel, based on the information from the header information analyzing unit 1001 and the image signal from image buffer 107, whether the image signal of the local region is within the noise range. The determination result of the noise determining unit 111 and information relating to the noise range are transferred to the noise reducing unit 112.

Based on the determination result of the noise determining unit 111 and the information relating to the noise range, the noise reducing unit 112 performs the noise reduction process on the image signal on the image buffer 107, and transfers the noise reduced image signal to the signal processing unit 113. Under the control of the control unit 115, the noise determining unit 111 and the signal processing unit 113 operate in synchronization with each other for each pixel. After completing the noise reduction processing of a predetermined number of pixels, for example, 8×8 pixels, the signal processing unit 113 under the control of the control unit 115 performs universally known enhancement process and the like, and supplies the resulting signal to the output unit 114. The output unit 114 outputs the resulting signal to a monitor and the like.

With the above arrangement, an optimum noise reduction process is performed during playback.

In the above embodiment, the signal from the black-and-white CCD is processed. The present invention is not limited to this arrangement. In the same way as in the second embodiment, the image signal may be divided into color signals so that the third embodiment may be applicable to a color single CCD system, a color two CCD system, a color three CCD system and the like.

In each of the preceding three embodiments, signal processing is performed using hardware. The present invention is not limited to signal processing using hardware. Using a central processing unit (CPU), the above-referenced process may be performed using software.

Figure 22:
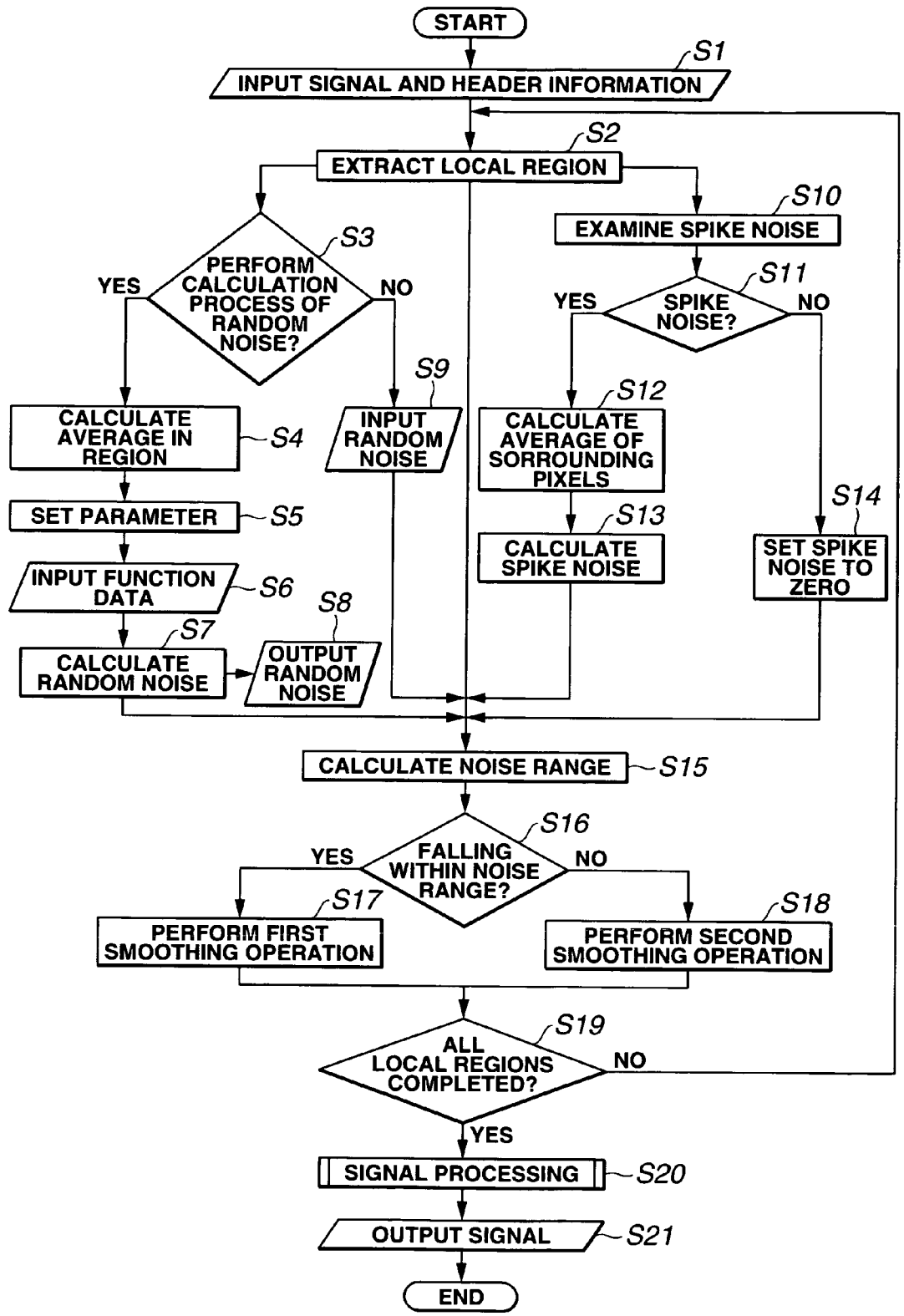
FIG. 22 is a flow chart illustrating an example processing flow of a noise reduction process of the present invention.

FIG. 22 is a flow chart illustrating an example of process flow when the noise reduction process is performed using software. In step 1, the image signal and the header information relating to temperature, gain, etc., are read. In step 2, an image signal of a local region having a predetermined size, for example, a unit of 3×3 pixels is extracted. In step 3, it is determined whether random noise is to be calculated. If it is determined that the random noise is to be calculated, processing proceeds to step 4. If it is determined that the random noise is not to be calculated, processing proceeds to step 9.

In step 4, an average value of the image signal of the local region is calculated as described in equation (3). In step 5, parameters such as temperature and gain are determined from the read header information. If the required parameters are not found in the header information, predetermined standard values are assigned.

In step 6, function information for use in the calculation of random noise shown in FIGS. 8 through 10 is read. In step 7, the random noise amount represented by equation (7) is calculated. In step 8, the random noise amount calculated in accordance with equation (7) as necessary is output to be stored.

In step 9, the random noise amount output and stored in step 7 is read. In step 10, examination relating to spike noise is performed under conditions represented by equations (8) and (9). In step 11, if it is determined that the examination in step 10 shows that the noise is spike noise, processing proceeds to step 12. If it is determined in step 11 that the noise is not spike noise, processing proceeds to step 14.

In step 12, an average value of the surrounding pixels is calculated as represented in equation (10). In step 13, the spike noise amount is calculated as represented in equation (11). In step 14, the spike noise amount is set to zero. In step 15, the noise range represented in equations (1) and (2) are calculated based on the random noise amount determined in one of step 7 and step 9 and the spike noise amount determined in one of step 13 and step 14. In step 16, it is determined whether the target pixel is within the noise range. If it is determined that the target pixel is within the noise range, processing proceeds to step 17. If it is determined that the target pixel is outside the noise range, processing proceeds to step 18.

In step 17, the substitution process of substituting the average value of the local region indicated by equation (12) for the target pixel is performed. In step 18, the correction process represented by one of equations (13) and (14) is performed to the target pixel. In step 19, a judgment is made as to whether or not the extraction of all local regions has been completed, in cases where the extraction has not been completed, the processing returns to the abovementioned step 2, while in cases where the extraction has been completed, the processing proceeds to step 20. In step 20, the known enhancement process is performed. In step 21, the processed signal is output.

As described above, since the image processing apparatus of each of the above-described first through third embodiments determines the presence or absence of noise and performs the noise reduction process for each pixel, optimum noise reduction is performed.

A program executing the above-described image processing operation may be recorded or stored, partly or entirely, on one of portable media, including floppy disk (registered trademark), and CD-ROM, and a hard disk in a recording device. The program is read by a computer and the operation is performed partly or entirely. The program in whole or part may be distributed or provided via a communication network. A user may download and install the program via the communication network onto the computer or may install the program onto the computer from a recording medium. The image processing apparatus of the present invention may be thus easily embodied in an image pickup system or a playback system.

The embodiments of the present invention provide the image processing apparatus that results in a high-quality image signal by determining noise amount in an optimum fashion and performing noise reduction process.

The present invention is applicable not only to processing of still picture but also a video signal in a moving picture, namely, a picture signal.

The present invention is not limited to the above-described embodiments, and a variety of changes and modifications are possible in the above-described embodiments without departing from the scope of the present invention.

What is claimed is:

1. An image processing apparatus for reducing noise contained in an image signal picked up by an image pickup element and digitized, comprising:
   a determining unit which determines whether or not a target pixel in the image signal is within a predetermined noise range for each pixel, and
   a noise reducing unit which reduces noise of the target pixel based on the determination result,
   wherein the determining unit includes:
   a first noise estimating unit which estimates an amount of random noise,
   a second noise estimating unit which estimates an amount of spike noise,
   a range calculating unit which calculates the noise range based on the amount of random noise estimated by the first noise estimating unit and the amount of spike noise estimated by the second noise estimating unit, and
   an examining unit which examines whether a signal level of the target pixel is within the noise range.

2. The image processing apparatus according to claim 1, wherein the image signal is an image signal output from the image pickup element in an image pickup apparatus.

3. The image processing apparatus according to claim 1, wherein the image signal is an image signal read from a storage device.

4. The image processing apparatus according to claim 1, wherein the image signal includes a plurality of color signals for each color filter,
   wherein the image processing apparatus comprises a separating unit which separates the image signal into a color signal for each color filter, and
   wherein the determining unit which determines whether or not the target pixel in the each color signal is within the noise range for each pixel.

5. The image processing apparatus according to claim 1, wherein the first noise estimating unit comprises:
   an extracting unit which extracts a local region containing the target pixel from the image signal,
   a parameter calculating unit which calculates a parameter based on at least one of an average of the local region extracted by the extracting unit, a temperature of the image pickup element, and a gain to the image signal, and
   a random noise amount calculating unit which calculates an amount of random noise of the target pixel based on the parameter.

6. The image processing apparatus according to claim 5, wherein the random noise amount calculating unit comprises:
   a standard parameter value providing unit which provides a standard parameter value to a parameter that is not obtained by the parameter calculating unit,
   a coefficient calculating unit which calculates coefficients A, B, and C based on three functions a(T,G), b(T,G), and c(T,G) having temperature T of an image pickup unit for picking up the image signal, and gain G to the image signal, as parameters provided by one of the parameter calculating unit and the standard parameter value providing unit, and
   a function calculating unit which calculates the amount N of random noise from an average value L of the local region and the above coefficients A, B, and C based on an equation, the equation being $N = AL^B + C$ or $N = AL^2 + BL + C$.

7. The image processing apparatus according to claim 5, wherein the random noise amount calculating unit comprises:
   a standard parameter value providing unit which provides a standard parameter value to a parameter that is not calculated by the parameter calculating unit, and
   a lookup table unit which determines the amount of random noise in response to the input of an average value of the local region, a temperature of the image pickup element system, and a gain to the image signal obtained by one of the parameter calculating unit and the standard parameter value providing unit.

8. The image processing apparatus according to claim 1, wherein the first noise estimating unit comprises:
   a recording unit which records the calculated amount of random noise, and
   a selecting unit which selects one of calculating an amount of new random noise and using the recorded amount of random noise.

9. The image processing apparatus according to claim 1, wherein the second noise estimating unit comprises:
   an extracting unit which extracts a local region containing a target pixel from the image signal,
   a spike noise examining unit which examines whether the target pixel contains a spike noise component, and
   a spike noise amount calculating unit which calculates the amount of spike noise of the target pixel based on the target pixel and other pixels surrounding the target pixel in the local region if the determination of the spike noise examining unit indicates that the target pixel contains spike noise.

10. The image processing apparatus according to claim 9, wherein the spike noise examining unit comprises a comparing unit which compares the target pixel with the other pixels surrounding the target pixel in the local region.

11. The image processing apparatus according to claim 9, wherein the spike noise amount calculating unit comprises:
    an average calculating unit which calculates an average of the other pixels surrounding the target pixels in the local region, and
    a difference calculating unit which calculates a difference between the target pixel and the average value.

12. The image processing apparatus according to claim 2, wherein the second noise estimating unit comprises:
    an extracting unit which extracts a local region containing a target pixel from the image signal,
    a spike noise examining unit which examines whether the target pixel contains a spike noise component, and
    a spike noise amount calculating unit which calculates the amount of spike noise of the target pixel based on the target pixel and other pixels surrounding the target pixel in the local region if the determination of the spike noise examining unit indicates that the target pixel contains spike noise.

13. The image processing apparatus according to claim 12, wherein the spike noise examining unit comprises a comparing unit which compares the target pixel with the other pixels surrounding the target pixel in the local region.

14. The image processing apparatus according to claim 12, wherein the spike noise amount calculating unit comprises:
    an average calculating unit which calculates an average of the other pixels surrounding the target pixels in the local region, and
    a difference calculating unit which calculates a difference between the target pixel and the average value.

15. The image processing apparatus according to claim 3, wherein the second noise estimating unit comprises:
    an extracting unit which extracts a local region containing a target pixel from the image signal, a spike noise examining unit which examines whether the target pixel contains a spike noise component, and a spike noise amount calculating unit which calculates the amount of spike noise of the target pixel based on the target pixel and other pixels surrounding the target pixel in the local region if the determination of the spike noise examining unit indicates that the target pixel contains spike noise.

16. The image processing apparatus according to claim 15, wherein the spike noise examining unit comprises a comparing unit which compares the target pixel with the other pixels surrounding the target pixel in the local region.

17. The image processing apparatus according to claim 15, wherein the spike noise amount calculating unit comprises:

an average calculating unit which calculates an average of the other pixels surrounding the target pixels in the local region, and a difference calculating unit which calculates a difference between the target pixel and the average value.

18. The image processing apparatus according to claim 4, wherein the second noise estimating unit comprises:

an extracting unit which extracts a local region containing a target pixel from the image signal, a spike noise examining unit which examines whether the target pixel contains a spike noise component, and a spike noise amount calculating unit which calculates the amount of spike noise of the target pixel based on the target pixel and other pixels surrounding the target pixel in the local region if the determination of the spike noise examining unit indicates that the target pixel contains spike noise.

19. The image processing apparatus according to claim 18, wherein the spike noise examining unit comprises a comparing unit which compares the target pixel with the other pixels surrounding the target pixel in the local region.

20. The image processing apparatus according to claim 18, wherein the spike noise amount calculating unit comprises:

an average calculating unit which calculates an average of the other pixels surrounding the target pixels in the local region, and a difference calculating unit which calculates a difference between the target pixel and the average value.

21. The image processing apparatus according to claim 1, wherein the range calculating unit comprises:

an amplitude value setting unit which sets an amplitude value based on the amount of random noise, and an amplitude value correction unit which corrects the amplitude value based on the amount of spike noise.

22. The image processing apparatus according to claim 2, wherein the range calculating unit comprises:

an amplitude value setting unit which sets an amplitude value based on the amount of random noise, and an amplitude value correction unit which corrects the amplitude value based on the amount of spike noise.

23. The image processing apparatus according to claim 3, wherein the range calculating unit comprises:

an amplitude value setting unit which sets an amplitude value based on the amount of random noise, and an amplitude value correction unit which corrects the amplitude value based on the amount of spike noise.

24. The image processing apparatus according to claim 4, wherein the range calculating unit comprises:

an amplitude value setting unit which sets an amplitude value based on the amount of random noise, and an amplitude value correction unit which corrects the amplitude value based on the amount of spike noise.

25. The image processing apparatus according to claim 1, wherein the range calculating unit comprises:

a control value setting unit which sets, based on the amount of random noise, a control value controlling frequency characteristics of a smoothing process, and a control value correction unit which corrects the control value based on the amount of spike noise.

26. The image processing apparatus according to claim 2, wherein the range calculating unit comprises:

a control value setting unit which sets, based on the amount of random noise, a control value controlling frequency characteristics of a smoothing process, and a control value correction unit which corrects the control value based on the amount of spike noise.

27. The image processing apparatus according to claim 3, wherein the range calculating unit comprises:

a control value setting unit which sets, based on the amount of random noise, a control value controlling frequency characteristics of a smoothing process, and a control value correction unit which corrects the control value based on the amount of spike noise.

28. The image processing apparatus according to claim 4, wherein the range calculating unit comprises:

a control value setting unit which sets, based on the amount of random noise, a control value controlling frequency characteristics of a smoothing process, and a control value correction unit which corrects the control value based on the amount of spike noise.

29. The image processing apparatus according to claim 1, wherein the noise reducing unit comprises:

a first smoothing unit which smoothes the target pixel if the determination result is within the noise range, and a second smoothing unit which corrects the target pixel if the determination result is outside the noise range.

30. The image processing apparatus according to claim 2, wherein the noise reducing unit comprises:

a first smoothing unit which smoothes the target pixel if the determination result is within the noise range, and a second smoothing unit which corrects the target pixel if the determination result is outside the noise range.

31. The image processing apparatus according to claim 3, wherein the noise reducing unit comprises:

a first smoothing unit which smoothes the target pixel if the determination result is within the noise range, and a second smoothing unit which corrects the target pixel if the determination result is outside the noise range.

32. The image processing apparatus according to claim 4, wherein the noise reducing unit comprises:

a first smoothing unit which smoothes the target pixel if the determination result is within the noise range, and a second smoothing unit which corrects the target pixel if the determination result is outside the noise range.

33. The image processing apparatus according to claim 21, wherein the noise reducing unit comprises:

a first smoothing unit which absorbs an amplitude component within the corrected amplitude value, and a second smoothing unit which corrects an amplitude component outside the corrected amplitude value.

34. The image processing apparatus according to claim 22, wherein the noise reducing unit comprises:

a first smoothing unit which absorbs an amplitude component within the corrected amplitude value, and a second smoothing unit which corrects an amplitude component outside the corrected amplitude value.

35. The image processing apparatus according to claim 23, wherein the noise reducing unit comprises:

a first smoothing unit which absorbs an amplitude component within the corrected amplitude value, and a second smoothing unit which corrects an amplitude component outside the corrected amplitude value.

36. The image processing apparatus according to claim 24, wherein the noise reducing unit comprises:

a first smoothing unit which absorbs an amplitude component within the corrected amplitude value, and a second smoothing unit which corrects an amplitude component outside the corrected amplitude value.

37. The image processing apparatus according to claim 25, wherein the noise reducing unit further comprises:

a first smoothing unit which reduces a particular frequency band from the control value, and a second smoothing unit which reduces a predetermined frequency band.

38. The image processing apparatus according to claim 26, wherein the noise reducing unit further comprises:

a first smoothing unit which reduces a particular frequency band from the control value, and a second smoothing unit which reduces a predetermined frequency band.

39. The image processing apparatus according to claim 27, wherein the noise reducing unit further comprises:

a first smoothing unit which reduces a particular frequency band from the control value, and a second smoothing unit which reduces a predetermined frequency band.

40. The image processing apparatus according to claim 28, wherein the noise reducing unit further comprises:

a first smoothing unit which reduces a particular frequency band from the control value, and a second smoothing unit which reduces a predetermined frequency band.

41. An image processing method for reducing noise contained in an image signal picked up by an image pickup element and digitized, comprising:

determining whether or not a target pixel in the image signal is within a predetermined noise range for each pixel, by estimating a amount of random noise, and an amount of spike noise, by calculating a noise range based on the estimated amount of random noise and the estimated amount of spike noise, and by examining whether or not the signal level of the target pixel in the image signal is within the noise range, and reducing noise of the target pixel based on the determination result.

42. A program, recorded in a non-transitory computer readable medium, for causing a computer to perform an image processing for reducing noise contained in an image signal picked up by an image pickup element and digitized, comprising:

determining whether or not a target pixel in the image signal is within a predetermined noise range for each pixel, by estimating a amount of random noise, and an amount of spike noise, by calculating a noise range based on the estimated amount of random noise and the estimated amount of spike noise, and by examining whether or not the signal level of the target pixel in the image signal is within the noise range, and reducing noise of the target pixel based on the determination result.

* * * * *